United States Patent
Fukushima et al.

(10) Patent No.: US 11,447,673 B2
(45) Date of Patent: Sep. 20, 2022

(54) COMPOSITION FOR HEAT CYCLE SYSTEM, AND HEAT CYCLE SYSTEM

(71) Applicant: AGC Inc., Tokyo (JP)

(72) Inventors: Masato Fukushima, Tokyo (JP); Hiroki Hayamizu, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/218,362

(22) Filed: Mar. 31, 2021

(65) Prior Publication Data

US 2021/0222040 A1 Jul. 22, 2021

Related U.S. Application Data

(63) Continuation of application No. PCT/JP2019/038790, filed on Oct. 1, 2019.

(30) Foreign Application Priority Data

Oct. 1, 2018 (JP) .............................. JP2018-186916
Oct. 12, 2018 (JP) .............................. JP2018-193586

(51) Int. Cl.
*C09K 5/04* (2006.01)
*F25B 27/00* (2006.01)

(52) U.S. Cl.
CPC .............. *C09K 5/044* (2013.01); *C09K 5/048* (2013.01); *F25B 27/00* (2013.01); *C09K 2205/122* (2013.01); *C09K 2205/126* (2013.01); *C09K 2205/128* (2013.01); *C09K 2205/22* (2013.01)

(58) Field of Classification Search
CPC .. C09K 5/044; C09K 5/048; C09K 2205/122; C09K 2205/126; C09K 2205/128; C09K 2205/22; C09K 2205/12; C09K 2205/40; C09K 5/045; F25B 27/00; F25B 1/00; F25B 2400/12
USPC ........................................................ 252/67
See application file for complete search history.

(56) References Cited

U.S. PATENT DOCUMENTS

| | | | | |
|---|---|---|---|---|
| 10,655,039 | B2 * | 5/2020 | Schultz ................... | C09K 5/044 |
| 11,072,734 | B2 * | 7/2021 | Fukushima ............ | C09K 5/045 |
| 11,220,620 | B2 * | 1/2022 | Schultz ................... | C09K 5/045 |
| 2014/0070132 | A1 * | 3/2014 | Fukushima ............. | F25B 9/002 252/67 |
| 2016/0333241 | A1 * | 11/2016 | Fukushima .......... | C10M 171/00 |
| 2016/0347980 | A1 | 12/2016 | Okamoto | |
| 2016/0347982 | A1 * | 12/2016 | Fukushima ............ | C09K 5/045 |
| 2016/0355717 | A1 * | 12/2016 | Fukushima ............. | F25B 43/00 |
| 2016/0355719 | A1 * | 12/2016 | Fukushima ........... | F25B 31/002 |
| 2018/0079941 | A1 | 3/2018 | Ueno et al. | |
| 2019/0203092 | A1 * | 7/2019 | Schultz .................. | C09K 5/045 |

FOREIGN PATENT DOCUMENTS

| | | |
|---|---|---|
| CN | 107987797 A | 5/2018 |
| CN | 107987798 A | 5/2018 |
| EP | 3 505 589 A1 | 7/2019 |
| JP | 2018-104566 A | 7/2018 |
| WO | WO 2012/157764 A1 | 11/2012 |
| WO | WO 2015/125885 A1 | 8/2015 |
| WO | WO 2016/194847 A1 | 12/2016 |

OTHER PUBLICATIONS

STN CAS reg. No. 75-10-5, Nov. 16, 1984. (Year: 1984).*
STN CAS reg. No. 754-12-1, Nov. 16, 1984. (Year: 1984).*
STN CAS reg. No. 359-11-5, Nov. 16, 1984. (Year: 1984).*
International Search Report dated Nov. 19, 2019 in PCT/JP2019/038790 filed on Oct. 1, 2019, 2 pages.

* cited by examiner

*Primary Examiner* — Douglas J McGinty
(74) *Attorney, Agent, or Firm* — Oblon, McClelland, Maier & Neustadt, L.L.P.

(57) ABSTRACT

To provide a composition for a hat cycle system which comprises a working fluid containing 1,1,2-trifluoroethylene, having cycle performance sufficient as an alternative to R410A while suppressing influence over global warming, and a heat cycle system employing the composition.
A composition for a heat cycle system, which comprises a working fluid for heat cycle containing 1,1,2-trifluoroethylene, $CF_3I$ and at least one compound selected from a hydrofluorocarbon, a hydrofluoroolefin other than 1,1,2-trifluoroethylene and a hydrocarbon, and having a temperature glide of at most 7° C., and a heat cycle system employing the composition for a heat cycle system.

12 Claims, 1 Drawing Sheet

COMPOSITION FOR HEAT CYCLE SYSTEM, AND HEAT CYCLE SYSTEM

TECHNICAL FIELD

The present invention relates to a composition for a heat cycle system and a heat cycle system employing the composition.

BACKGROUND ART

Heretofore, as a working fluid for a heat cycle system such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for a heat cycle system, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture refrigerant of HFC-32 and HFC-125 with a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired. On that occasion, development of a working fluid to be used on the assumption that conventional facilities are used as they are simply by replacing R410A has been desired.

Accordingly, in recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

As a working fluid employing a HFO, for example, Patent Document 1 discloses a technique relating to a working fluid using 1,1,2-trifluoroethylene (HFO-1123) which has the above properties and with which excellent cycle performance will be obtained. Patent Document 1 also discloses an attempt to obtain a working fluid comprising HFO-1123 and various HFCs or HFOs in combination for the purpose of increasing the flame retardancy, cycle performance, etc. of the working fluid.

Further, HFO-1123 is known to undergo so-called self-decomposition with an ignition source at high temperature or under high pressure. Therefore, it has been studied to blend a stabilizer which suppresses the self-decomposition of HFO-1123, and a working fluid containing $CF_3I$ as the stabilizer has been known (for example, Patent Documents 2 and 3).

PRIOR ART DOCUMENTS

Patent Documents

Patent Document 1: WO2012/157764
Patent Document 2: WO2015/125885
Patent Document 3: JP-A-2018-104566

DISCLOSURE OF INVENTION

Technical Problem

By use of HFO-1123 and $CF_3I$ in combination, high heat cycle performance of HFO-1123 can be made use of while self-decomposition of HFO-1123 is suppressed, however, the temperature glide of the working fluid increases as the content of $CF_3I$ increases, and the composition in the heat cycle system may change, such being problematic practically.

Accordingly, the object of the present invention is to provide a composition for a heat cycle system comprising a working fluid, which is a composition for a heat cycle system containing HFO-1123 and $CF_3I$, which makes use of high heat cycle performance of HFO-1123 and at the same time brings the temperature glide to be within a predetermined range; and a heat cycle system employing the composition.

Another object of the present invention is to provide a composition for a heat cycle system comprising a working fluid for heat cycle, which has properties such as suppression of impact on global warming, impartment of incombustibility, and sufficiency as an alternative to R410A, R407C and R404A, and a heat cycle system employing the composition.

Solution to Problem

The present invention provides a composition for a heat cycle system, and a heat cycle system, according to the following [1] to [9].

[1] A composition for a heat cycle system, which comprises a working fluid for heat cycle containing 1,1,2-trifluoroethylene, $CF_3I$ and at least one compound selected from a hydrofluorocarbon, a hydrofluoroolefin other than 1,1,2-trifluoroethylene and a hydrocarbon, and having a temperature glide of at most 7° C.

[2] The composition for a heat cycle system according to [1], wherein the hydrofluorocarbon is difluoromethane, pentafluoroethane, 1,1,1,2-tetrafluoroethane or fluoroethane.

[3] The composition for a heat cycle system according to [1] or [2], wherein the hydrofluorocarbon is difluoromethane.

[4] The composition for a heat cycle system according to [1] or [2], wherein the hydrofluorocarbon is pentafluoroethane.

[5] The composition for a heat cycle system according to [1] or [2], wherein the hydrofluorocarbon is 1,1,1,2-tetrafluoroethane.

[6] The composition for a heat cycle system according to [1] or [2], wherein the hydrofluorocarbon is fluoroethane.

[7] The composition for a heat cycle system according to any one of [1] to [6], wherein the hydrofluoroolefin is 2,3,3,3-tetrafluoropropene, trans-1,3,3,3-tetrafluoropropene, cis-1,3,3-tetrafluoropropene, trans-1,2-difluoroethylene or cis-1,2-difluoroethylene.

[8] The composition for a heat cycle system according to any one of [1] to [7], wherein the hydrocarbon is propane.

[9] The composition for a heat cycle system according to any one of [1] to [8], wherein the content of the hydrofluorocarbon is from 10 to 30 mass %.

[10] The composition for a heat cycle system according to any one of [1] to [9], which is incombustible.
[11] A heat cycle system, which employs the composition for a heat cycle system as defined in any one of [1] to [10].
[12] The heat cycle system according to [11], which is a refrigerating apparatus, an air-conditioning apparatus, a power generation system, a heat transport apparatus or a secondary cooling machine.

Advantageous Effects of Invention

According to the present invention, it is possible to provide a composition for a heat cycle system, which comprises a mixed working fluid having low temperature glide while exhibiting excellent cycle performance of 1,1,2-trifluoroethylene (HFO-1123), sufficient as an alternative to R410A, R407C and R404A.

The heat cycle system of the present invention, to which the composition for a heat cycle system of the present invention is applied, achieves both high cycle performance and durability.

DESCRIPTION OF EMBODIMENTS

Figure 1:
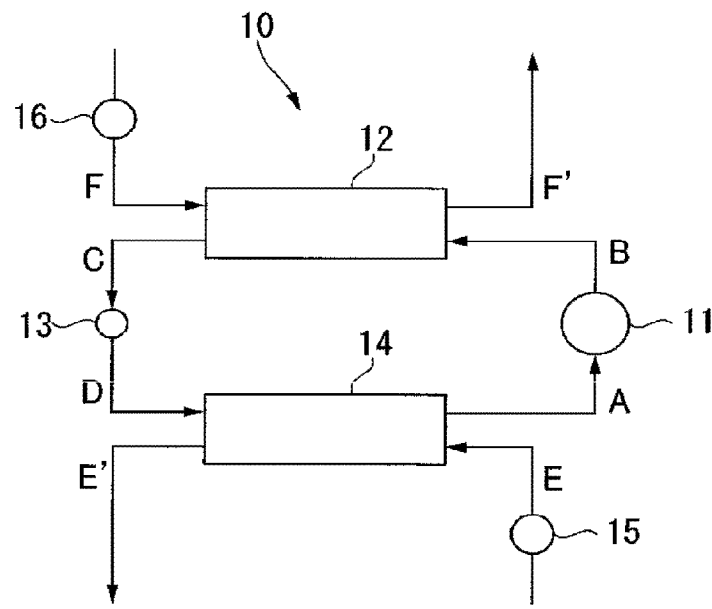
FIG. 1 is a schematic construction view illustrating a refrigerating cycle system as an example of the heat cycle system of the present invention.

Now, the present invention will be described in detail with reference to embodiments.

In this specification, abbreviated names of halogenated hydrocarbon compounds are described in brackets after the compound names, and in this specification, the abbreviated names are employed instead of the compound names as the case requires.

Further, in this specification, a name or abbreviated name of a compound having E form and Z form as geometrical isomers depending upon the position of a substituent bonded to the carbon atom having a double bond, without any specific description, means any of the E form, the Z form and a mixture of the E form and the Z form at an optional proportion. (Z) or (E) after a name or abbreviated name of a compound means Z form or E form of the compound.

[Composition for Heat Cycle System]

The composition for a heat cycle system according to the present embodiment comprises a working fluid for heat cycle (hereinafter sometimes referred to simply as "working fluid") containing HFO-1123, CF$_3$I and at least one compound selected from a hydrofluorocarbon (HFC), a hydrofluoroolefin (HFO) other than HFO-1123 and a hydrocarbon (HC), and having a temperature glide of at most 7° C.

The composition for a heat cycle system according to the present embedment comprises a working fluid having a suppressed temperature glide, which can be used as an alternative to R410A or R407C.

<Working Fluid>

The composition for a heat cycle system according to the present invention, as described above, comprises a working fluid containing HFO-1123, CF$_3$I and at least one compound selected from a HFC, a HFO other than HFO-1123 and a HC.

HFO-1123 used in the present embodiment is 1,1,2-trifluoroethylene known as a working fluid. HFO-1123 is a compound having high cycle performance for heat cycle, having low GWP and being preferred as a working fluid considering global environment. The relative cycle performance (relative coefficient of performance and relative refrigerating capacity) of HFO-1123 is shown in Table 1. The relative cycle performance is relative comparison with R410A (a pseudoazeotropic mixture refrigerant of HFC-32 and HFC-125 with a mass ratio of 1:1). In this specification, the relative coefficient of performance will sometimes be referred to as relative COP, and the relative refrigerating capacity will sometimes be referred to as relative capacity. The composition for cycle system according to the present embodiment is considered also from the viewpoint of alternative to R407C (a mixed composition of HFC-32, HFC-125 and HFC-134a with a mass ratio of 23:25:52) and R134a, and in Table 1 are also shown values of R407C and R134a relatively compared with R410A for reference.

TABLE 1

|  | R410A | R407C | HFO-1123 | R134a |
| --- | --- | --- | --- | --- |
| Relative coefficient of performance | 1 | 1.05 | 0.94 | 1.08 |
| Relative refrigerating capacity | 1 | 0.71 | 1.12 | 0.45 |
| Temperature glide [° C.] | 0 | 5 | 0 | 0 |
| GWP | 1924 | 1624 | <1 | 1300 |
| Discharge pressure difference [kPa] | 0 | −866.9 | 656.2 | −1569.9 |
| Discharge temperature difference [° C.] | 0 | −2.7 | −8.8 | −11.8 |

CF$_3$I used in the present embodiment functions as a working fluid and can suppress self-decomposition of HFO-1123 as well. It is a component which can suppress combustibility when the composition for a heat cycle system containing the working fluid for heat cycle is discharged to the air, although influenced e.g. by the proportion of other component.

The compound used in the present embodiment is at least one compound selected from a HFC, a HFO other than HFO-1123 and a HC. Such compounds can improve desired properties when used in combination with HFO-1123 and CF$_3$I. Now, these compounds will be described.

(HFC)

The HFC used in the present embodiment is preferably selected from the above viewpoint. That is, the HFC to be used in combination with HFO-1123 and CF$_3$I is properly selected with a view to improving the cycle performance of the working fluid and bringing the temperature glide to be within an appropriate range. Further, it is preferably properly selected with a view to brining GWP to be within an acceptable range and suppressing combustibility when formed into a composition for a heat cycle system.

As the HFC having less influence over the ozone layer and having less influence over global warming, specifically, a C$_{1-5}$ HFC is preferred. The HFC may be linear, branched or cyclic.

The HFC may, for example, be difluoromethane (HFC-32), fluoroethane (HFC-161), difluoroethane, trifluoroethane, tetrafluoroethane, pentafluoroethane (HFC-125), pentafluoropropane, hexafluoropropane, heptafluoropropane, pentafluorobutane or heptafluorocyclopentane.

Particularly, in view of less influence over the ozone layer and excellent refrigerating cycle property, the HFC is preferably HFC-32, HFC-161, 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or HFC-125, more preferably HFC-32, HFC-161, HFC-152a, HFC-134a or HFC-125, further preferably HFC-32, HFC-134a or HFC-125.

The HFC may be used alone or in combination of two or more.

(HFO)

The HFO other than HFO-1123, as an optional component, is also preferably selected from the same viewpoint as the above HFC. Here, GWP of the HFO even other than HFO-1123 is an order of magnitude lower than the HFC. Accordingly, the HFO other than HFO-1123 used in combination with HFO-1123 is preferably selected properly particularly with a view to improving the cycle performance as the working fluid and maintaining the temperature glide and the discharge temperature difference within appropriate ranges, rather than considering GWP.

The HFO other than HFO-1123 may, for example, be 2,3,3,3-tetrafluoropropene (HFO-1234yf), 1,1-difluoroethylene (HFO-1132a), trans-1,2-difluoroethylene (HFO-1132(E)), cis-1,2-difluoroethylene (HFO-1132(Z)), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf).

Particularly, the HFO other than HFO-1123 is, in view of high critical temperature and excellent safety and coefficient of performance, preferably HFO-1132(E), HFO-1132(Z), HFO-1234yf, HFO-1234ze(E), HFO-1234ze(Z) or HFO-1243zf, more preferably HFO-1132(E), HFO-1132(Z), HFO-1234yf, HFO-1234ze(E) or HFO-1234ze(Z), further preferably HFO-1234yf. The HFO other than HFO-1123 may be used alone or in combination of two or more.

(HC)

The HC may, for example, be propane, propylene, cyclopropane, butane, isobutane, pentane or isopentane. Particularly, the HC is, in view of excellent safety and coefficient of performance and low GWP, preferably propane.

The HC may be used alone or in combination of two or more.

The working fluid to be used in the present embodiment contains, in addition to the above described HFO-1123 and $CF_3I$, a compound to be used in combination with them, as an essential component. Now, the contents of the respective components in the working fluid will be described below.

In a case where the HFC is contained, its content can optionally be selected depending upon properties required for the working fluid. In the case of a working fluid containing HFO-1123, $CF_3I$ and HFC-125, a content of HFO-1123 of from 40 to 60 mass %, a content of $CF_3I$ of from 10 to 30 mass %, and a content of HFC-125 of from 20 to 30 mass % are preferred, within which the temperature glide will be decreased, and the relative coefficient of performance will improve. With a view to further decreasing the temperature glide, a content of HFO-1123 of from 50 to 60 mass %, a content of from $CF_3I$ of from 10 to 20 mass % and a content of HFC-125 of from 20 to 30 mass % are more preferred. HFC-1245 is preferred also with a view to making the obtainable working fluid incombustible.

In the case of a working fluid containing HFO-1123, $CF_3I$ and HFC-134a, a content of HFO-1123 of from 30 to 60 mass %, a content of $CF_3I$ of from 10 to 40 mass %, and a content of HFC-134a of from 20 to 40 mass % are preferred, within which the temperature glide will be decreased. With a view to further increasing the capacity, a content of HFO-1123 of from 40 to 60 mass %, a content of from $CF_3I$ of from 10 to 30 mass % and a content of HFC-134a of from 20 to 40 mass % are more preferred. HFC-134a is preferred also with a view to making the obtainable working fluid incombustible.

In the case of a working fluid containing HFO-1123, $CF_3I$ and HFC-32, a content of HFO-1123 of higher than 0 and at most 60 mass %, a content of $CF_3I$ of from 10 to 60 mass %, and a content of HFC-32 of from 10 to less than 90 mass % are preferred, within which the temperature glide will be decreased, and the relative coefficient of performance will improve. With a view to decreasing GWP, a content of HFO-1123 of higher than 0 and at most 60 mass %, a content of $CF_3I$ of higher than 10 mass % and less than 50 mass % and a content of HFC-32 of at least 10 mass % and less than 90 mass % are more preferred. HFC-32 is preferred also with a view to suppressing GWP of the obtainable working fluid low.

In the case of a working fluid containing HFO-1123, $CF_3I$ and HFC-161, a content of HFO-1123 of from 30 to 60 mass %, a content of $CF_3I$ of from 20 to 50 mass %, and a content of HFC-161 of from 10 to 30 mass % are preferred, within which the temperature glide will be decreased. With a view to further decreasing the temperature glide, a content of HFO-1123 of from 30 to 60 mass %, a content of from $CF_3I$ of from 20 to 50 mass % and a content of HFC-161 of from 20 to 30 mass % are more preferred.

In a case where the HFC is contained, a plurality of HFC may be contained. Their contents can optionally be selected depending upon properties required for the working fluid. For example, in the case of a working fluid containing HFO-1123, $CF_3I$, HFC-125 and HFC-32, a content of HFO-1123 of from 10 to 40 mass %, a content of $CF_3I$ of from 30 to 50 mass %, a content of HFC-125 of from 10 to 20 mass % and a content of HFC-32 of from 10 to 40 mass % are preferred, within which the temperature glide will be decreased. With a view to improving the relative capacity, a content of HFO-1123 of from 10 to 40 mass %, a content of $CF_3I$ of at least 20 mass % and less than 40 mass %, a content of HFC-125 of from 10 to 20 mass % and a content of HFC-32 of from 10 to 40 mass % are preferred.

Further, for example, in the case of a working fluid containing HFO-1123, $CF_3I$, HFC-125, HFC-134a and HFC-32, a content of HFO-1123 of from 10 to 40 mass %, a content of $CF_3I$ of from 10 to 30 mass %, a content of HFC-125 of from 5 to 15 mass %, a content of HFC-134a of from 10 to 30 mass % and a content of HFC-32 of from 10 to 40 mass % are preferred, within which the temperature glide will be decreased. With a view to further decreasing the temperature glide, a content of HFO-1123 of from 10 to 40 mass %, a content of $CF_3I$ of higher than 10 mass % and at most 30 mass %, a content of HFC-125 of from 5 to 15 mass %, a content of HFC-134a of at least 10 mass % and less than 30 mass %, and a content of HFC-32 of from 10 to 40 mass %, are more preferred.

In a case where the HFO other than HFO-1123 is contained, the content can optionally be selected depending upon properties required for the working fluid. For example, in the case of a working fluid containing HFO-1123, $CF_3I$ and HFO-1234yf, a content of HFO-1123 of from 10 to 40 mass %, a content of $CF_3I$ of from 20 to 80 mass % and a content of HFO-1234yf of from 10 to 70 mass % are preferred, within which the working fluid has sufficient capacity, as compared with 134a refrigerant with a relative capacity (relative to R410A) of 0.45.

Further, with a view to further decreasing the temperature glide, a content of HFO-1123 of from 10 to 20 mass %, a content of $CF_3I$ of from 20 to 80 mass % and a content of HFO-1234yf of higher than 10 and at most 70 mass % are preferred. Further, with a view to improving the relative capacity, a content of HFO-1123 of from 20 to 40 mass %, a content of $CF_3I$ of from 20 to 50 mass % and a content of HFO-1234yf of higher than 30 and at most 60 mass % are preferred.

Further, for example, in the case of a working fluid containing HFO-1123, $CF_3I$ and HFO-1234ze(E), a content of HFO-1123 of from 10 to 20 mass %, a content of $CF_3I$ of from 30 to 70 mass % and a content of HFO-1234ze(E) of from 20 to 60 mass % are preferred, within which the working fluid has sufficient capacity, as compared with 134a refrigerant with a relative capacity (relative to R410A) of 0.45.

Further, with a view to further improving the relative capacity, a content of HFO-1123 of from 15 to 20 mass %, a content of $CF_3I$ of from 40 to 50 mass % and a content of HFO-1234ze(E) of from 30 to 40 mass % are preferred.

Further, for example, in the case of a working fluid containing HFO-1123, $CF_3I$ and HFO-1132(E), a content of HFO-1123 of from 10 to 90 mass %, a content of $CF_3I$ of from 10 to 40 mass % and a content of HFO-1132(E) of from 10 to 80 mass % are preferred, within which the working fluid has sufficient capacity, as compared with 134a refrigerant with a relative capacity (relative to R410A) of 0.45.

Further, with a view to further decreasing the temperature glide, a content of HFO-1123 of from 10 to 90 mass %, a content of $CF_3I$ of from 10 to 20 mass % and a content of HFO-1132(E) of from 10 to 80 mass % are preferred. Further, with a view to improving the relative capacity, a content of HFO-1123 of from 20 to 90 mass %, a content of $CF_3I$ of from 10 to 30 mass % and a content of HFO-1132(E) of from 10 mass % to 80 mass % are preferred.

HFO-1123 and HFO-1132(E) are known to undergo self-decomposition. With a view to suppressing the self-decomposition, a total content of HFO-1123 and HFO-1132(E) of at most 60 mass % is preferred.

Further, for example, in the case of a working fluid containing HFO-1123, $CF_3I$ and HFO-1132(Z), a content of HFO-1123 of from 10 to 20 mass %, a content of $CF_3I$ of from 10 to 60 mass % and a content of HFO-1132(Z) of from 10 to 80 mass % are preferred, within which the working fluid has a sufficient capacity, as compared with 134a refrigerant with a relative capacity (relative to R410A) of 0.45.

HFO-1123 and HFO-1132(E) are known to undergo self-decomposition. With a view to suppressing the self-decomposition, a total content of HFO-1123 and HFO-1132(Z) of at most 60 mass % is preferred.

Further, for example, in the case of a working fluid containing HFO-1123, $CF_3I$, HFC-32 and HFO-1132(E), a content of HFO-1123 of from 10 to 80 mass %, a content of $CF_3I$ of from 10 to 40 mass %, a content of HFC-32 of from 10 to 30 mass % and a content of HFO-1132(E) of from 10 to 70 mass % are preferred, within which the working fluid has a sufficient capacity, as compared with 134a refrigerant with a relative capacity (relative to R410A) of 0.45.

Further, with a view to further decreasing the temperature glide, a content of HFO-1123 of from 10 to 80 mass %, a content of $CF_3I$ of from 10 to 30 mass %, a content of HFO-32 of from 10 to 30 mass % and a content of HFO-1132(E) of from 10 to 70 mass % are preferred. Further, with a view to improving the relative capacity, a content of HFO-1123 of from 10 to 80 mass %, a content of $CF_3I$ of from 10 to 30 mass % and a content of HFO-1132(E) of from 10 to 60 mass % are preferred.

HFO-1123 and HFO-1132(E) are known to undergo self-decomposition. With a view to suppressing the self-decomposition, a total content of HFO-1123 and HFO-1132(E) of at most 60 mass % is preferred.

Further, for example, in the case of a working fluid containing HFO-1123, $CF_3I$, HFO-1234yf and HFO-1132(E), a content of HFO-1123 of from 10 to 80 mass %, a content of $CF_3I$ of from 10 to 40 mass % and a content of HFO-1132(E) of from 10 to 80 mass % are preferred, within which the working fluid has a sufficient capacity, as compared with 134a refrigerant with a relative capacity (relative to R410A) of 0.45.

Further, with a view to further decreasing the temperature glide, a content of HFO-1123 of from 10 to 80 mass %, a content of $CF_3I$ of from 10 to 20 mass % and a content of HFO-1132(E) of from 10 to 80 mass % are preferred. Further, with a view to improving the relative capacity, a content of HFO-1123 of from 10 to 80 mass %, a content of $CF_3I$ of from 10 to 30 mass % and a content of HFO-1132(E) of from 10 mass % to 80 mass % are preferred.

HFO-1123 and HFO-1132(E) are known to undergo self-decomposition. With a view to suppressing the self-decomposition, a total content of HFO-1123 and HFO-1132(E) of at most 60 mass % is preferred.

Further, for example, in the case of a working fluid containing HFO-1123, $CF_3I$, HFO-1132(E) and HFO-1132(Z), a content of HFO-1123 of from 10 to 70 mass %, a content of $CF_3I$ of from 10 to 30 mass %, a content of HFO-1132(E) of from 10 to 70 mass % and a content of HFO-1132(Z) of from 10 to 20 mass % are preferred, within which the working fluid has a sufficient capacity, as compared with 134a refrigerant with a relative capacity (relative to R410A) of 0.45.

Further, with a view to further decreasing the temperature glide, a content of HFO-1123 of from 10 to 70 mass %, a content of $CF_3I$ of from 10 to 20 mass %, a content of HFO-1132(E) of from 10 to 70 mass % and a content of HFO-1132(Z) of from 10 to less than 20 mass % are preferred.

HFO-1123, HFO-1132(E) and HFO-1132(Z) are known to undergo self-decomposition. With a view to suppressing the self-decomposition, a total content of HFO-1123, HFO-1132(E) and HFO-1132(Z) of at most 60 mass % is preferred.

Further, in a case where a HC is contained as the compound, the content may optionally be selected depending upon properties required for the working fluid. For example, in the case of a working fluid containing HFO-1123, $CF_3I$ and propane, a content of HFO-1123 of from 40 to 60 mass %, a content of $CF_3I$ of from 10 to 40 mass % and a content of propane of from 15 to 30 mass % are preferred, within which the temperature glide will be decreased. Further, propane is preferred, with which GWP of the obtainable working fluid can be kept low. Further, with a view to further decreasing the temperature glide, a content of HFO-1123 of from 40 to 60 mass %, a content of $CF_3I$ from 10 to 35 mass % and a content of propane of from 20 to 30 mass % are more preferred.

(Other Optional Component)

The working fluid to be used for the composition for a heat cycle system according to the present embodiment may further contain other optional component, such as a chlorofluoroolefin (CFO) or a hydrochlorofluoroolefin (HCFO). Such other optional component is preferably a component which has less influence over the ozone layer and which has less influence over global warming, within a range not to impair the effects of the present invention.

The CFO may, for example, be chlorofluoropropene or chlorofluoroethylene. With a view to suppressing combustibility of the working fluid without significantly decreasing the cycle performance of the working fluid, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

In a case where the working fluid contains the CFO, its content is preferably less than 10 mass %, more preferably from 1 to 8 mass %, further preferably from 2 to 5 mass % per 100 mass % of the working fluid. When the content of the CFO is at least the lower limit, the combustibility of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing combustibility of the working fluid without significantly decreasing the cycle performance of the working fluid, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid contains the HCFO, the content of the HCFO per 100 mass % of the working fluid is preferably less than 10 mass %, more preferably from 1 to 8 mass %, further preferably from 2 to 5 mass %. When the content of the HCFO is at least the lower limit, the combustibility of the working fluid tends to be suppressed. When the content of the HCFO is at most the upper limit, favorable cycle performance is likely to be obtained.

In a case where the working fluid to be used for the composition for a heat cycle system of the present invention contains the above other optional component, the total content of such other optional component in the working fluid is preferably less than 10 mass %, more preferably at most 8 mass %, further preferably at most 5 mass % per 100 mass % of the working fluid.

<Temperature Glide>

The temperature glide is an index to a difference in a composition between in a liquid phase and in a gas phase of the mixture as the working fluid. The temperature glide is defined as properties such that the initiation temperature and the completion temperature of evaporation in an evaporator or of condensation in a condenser, for example, a heat exchanger, differ from each other. The temperature glide of an azeotropic mixture fluid is 0, and the temperature glide of a pseudoazeotropic mixture such as R410A is extremely close to 0.

If the temperature glide is large, for example, the inlet temperature of an evaporator tends to be low, and frosting is likely to occur. Further, in a heat cycle system, the heat exchange efficiency is to be improved by making the working fluid and the heat source fluid such as water or the air flowing in heat exchangers flow in counter-current flow. Since the temperature difference of the heat source fluid is small in a stable operation state, it is difficult to obtain a heat cycle system with a good energy efficiency with a non-azeotropic mixture fluid with a large temperature glide. Accordingly, when a mixture is used as a working fluid, a working fluid with an appropriate temperature glide is desired.

Further, when a non-azeotropic mixture fluid is put into a refrigerator or an air-conditioning apparatus from a pressure container, it undergoes a composition change. Further, if a refrigerant leaks out from a refrigerator or an air-conditioning apparatus, the refrigerant composition in the refrigerator or the air-conditioning apparatus is very likely to change, and a recovery to an initial refrigerant composition is hardly possible. Whereas, the above problems can be avoided with the working fluid which is an azeotropic or pseudoazeotropic mixture.

Accordingly, the composition for a heat cycle system according to the present embodiment has a temperature glide of at most 7° C., more preferably at most 6° C., further preferably at most 5° C., particularly preferably at most 3° C.

<Global Warming Potential (GWP)>

In the present embodiment, as an index to the influence of the working fluid over global warming, GWP is employed. In this specification, GWP is a value (100 years) in Intergovernmental Panel on Climate Change (IPCC), Fifth assessment report (2013), unless otherwise specified. Further, GWP of a mixture is represented by a weighted average by the composition mass.

The global warming potential (100 years) of HFO-1123 which the working fluid of the present embodiment contains is 1 as a value measured in accordance with IPCC Fifth assessment report.

Further, R410A (a composition of HFC-125 and HFC-32 with a mass ratio of 1:1) which is excellent in the cycle performance, to be replaced by the working fluid according to the present embodiment, has an extremely high GWP of 1,924, and the two HFCs contained in R410A and other typical HFCs, for example, HFC-134a, have high GWP as shown in the following Table 2. R407C (a composition of HFC-32, HFC-125 and HFC-134a with a mass ratio of 23:25:52) excellent in the cycle performance, to be replaced by the working fluid according to the present embodiment, also has an extremely high GWP of 1,624.

TABLE 2

| Compound | GWP (AR5) |
| --- | --- |
| R410A | 1924 |
| R407C | 1624 |
| HFO-1123 | <1 |
| HFO-1234yf | <1 |
| HFO-1234ze(E) | <1 |
| HFC-32 | 677 |
| HFC-134a | 1300 |
| HFC-125 | 3170 |
| $CF_3I$ | <1 |
| $CO_2$ | 1 |

HFO-1123, which has very low GWP as mentioned above, is advantageous in that it can improve cycle performance while suppressing GWP low as compared with other HFOs, for example, when a mixture composition is to be obtained in combination with a HFC having high cycle performance and having high GWP, to improve the cycle performance, etc. In the present embodiment, $CF_3I$ which can stabilize HFO-1123 is also contained.

The working fluid to be used in the present embodiment has GWP of preferably at most 1,000, more preferably at most 750, more preferably at most 675, more preferably at most 500, more preferably at most 300, further preferably at most 250, particularly preferably at most 150.

<Cycle Performance>

Here, as a property required when a working fluid is applied to heat cycle, the cycle performance may be evaluated by the coefficient of performance (also referred to as "COP" in this specification) and the capacity (also referred to as "Q" in this specification). In a case where the heat cycle system is a refrigerating cycle system, the capacity is refrigerating capacity. As items to be evaluated when the working fluid is applied to a refrigerating cycle system, in addition to the above cycle performance, the temperature glide, the compressor discharge gas temperature and the compressor discharge pressure may further be mentioned. Specifically, a standard refrigerating cycle under the following temperature conditions is conducted, the respective items are measured by the after-mentioned methods for example, and except for the temperature glide, the measured values are calculated into relative values based on the values of R410A to be replaced. Now, the following items to be evaluated will be specifically described in detail.

(Temperature Conditions for Standard Refrigerating Cycle)

Evaporation temperature: 10° C. (in the case of a non-azeotropic mixture, the average temperature of the evaporation initiation temperature and the evaporation completion temperature)

Condensing temperature: 45° C. (in the case of a non-azeotropic mixture, the average temperature of the condensation initiation temperature and the condensation completion temperature)

Supercooling degree (SC): 10° C.
Degree of superheat (SH): 10° C.
Compressor efficiency: 0.7

<Relative Coefficient of Performance>

The coefficient of performance is a value obtained by dividing an output (kW) by the power (kW) consumed to obtain the output (kW) and corresponds to the energy consumption efficiency. A higher output will be obtained with a lower input when the coefficient of performance is higher. The relative coefficient of performance relative to R410A may be obtained in accordance with the following formula (1). In the formula (1), the sample is a working fluid to be subjected to relative evaluation.

$$\text{Relative performance of coefficient } (RCOP_{R410A}) = \frac{\text{Coefficient of performance of sample } (COP_{sample})}{\text{Coefficient of performance of } R410A(COP_{R410A})} \quad (1)$$

<Relative Refrigerating Capacity>

The refrigerating capacity is an output in the refrigerating cycle system. The relative refrigerating capacity relative to R410A may be obtained in accordance with the following formula (2). In the formula (2), the sample is the working fluid to be subjected to relative evaluation.

$$\text{Relative refrigerating capacity } (RQ_{R410A}) = \frac{\text{Refrigerating capacity of sample } (Q_{sample})}{\text{Refrigerating capacity of } R410A(Q_{R410A})} \quad (2)$$

<Compressor Discharge Pressure Difference>

A value (PΔ) obtained by subtracting the compressor discharge gas pressure ($P_{R410A}$) of R410A from the compressor discharge gas pressure (Px) of a sample i.e. the working fluid to be subjected to relative evaluation, is evaluated. The compressor discharge gas pressure (hereinafter sometimes referred to as "discharge pressure") in refrigerating cycle is the maximum pressure in the refrigerating cycle. The discharge pressure, which has influence over the design pressure of the compressor, is preferably lower. In order that the working fluid is useful as an alternative to R410A, the discharge pressure should be a pressure which equipment constituting the heat cycle system operated with R410A can withstand, whether it may be lower or higher than the discharge pressure of R410A.

<Compressor Discharge Gas Temperature Difference>

A value (TΔ) obtained by subtracting the compressor discharge gas temperature ($T_{R410A}$) of R410A from the compressor discharge gas temperature (Tx) of a sample i.e. the working fluid to be subjected to relative evaluation, is evaluated. The compressor discharge gas temperature (hereinafter sometimes referred to as "discharge temperature") in refrigerating cycle is the maximum temperature in the refrigerating cycle. The discharge temperature, which has influence over the material constituting a compressor, a refrigerant oil which the composition for a heat cycle system usually contains in addition to the working fluid, and the heat resistance of a polymer material, is preferably lower. In order that the working fluid is useful as an alternative to R410A, the discharge temperature should be a temperature which equipment constituting the heat cycle system operated with R410A can withstand, whether it may be lower or higher than the discharge temperature of R410A.

The working fluid used in the present embodiment, when used as an alternative to R410A, has a relative refrigerating capacity $RQ_{410A}$ of preferably from 0.70 to 1.50, more preferably from 0.90 to 1.50, particularly preferably from 1.00 to 1.50. In a case where the working fluid is used as an alternative to R407C, the relative performance may be evaluated by changing the denominators in the formulae (1) and (2) to the coefficient of performance and the refrigerating performance of R407C instead of R410A.

The working fluid used in the present embodiment may be used not only as an alternative to R410A but also as an alternative to R134a particularly when a HFO other than HFO-1123 is contained. In such a case, the relative refrigerating capacity $RQ_{410A}$ is preferably from 0.45 to 1.50, more preferably from 0.50 to 1.50, particularly preferably from 0.55 to 1.50.

Further, the relative coefficient of performance $RCOP_{R410A}$ is preferably from 0.85 to 1.20, more preferably from 0.90 to 1.20, particularly preferably from 0.95 to 1.20.

The discharge pressure difference PA is preferably at most 500, more preferably at most 100, particularly preferably at most 0.

The discharge temperature difference TA is preferably at most 30° C., more preferably at most 20° C., particularly preferably at most 10° C.

As the refrigerating cycle system employed for the above evaluation of properties, for example, a refrigerating cycle system of which the schematic construction view is shown in FIG. 1, may be used. Now, the method for evaluating the cycle performance, the temperature glide, the compressor discharge gas temperature (Tx) and the compressor discharge pressure (Px) employing the refrigerating cycle system shown in FIG. 1 will be described.

A refrigerating cycle system 10 shown in FIG. 1 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled to form a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure-enthalpy diagram (curve) as shown in FIG. 2, may be represented as a trapezoid having points A, B, C and D as vertexes.

Figure 2:
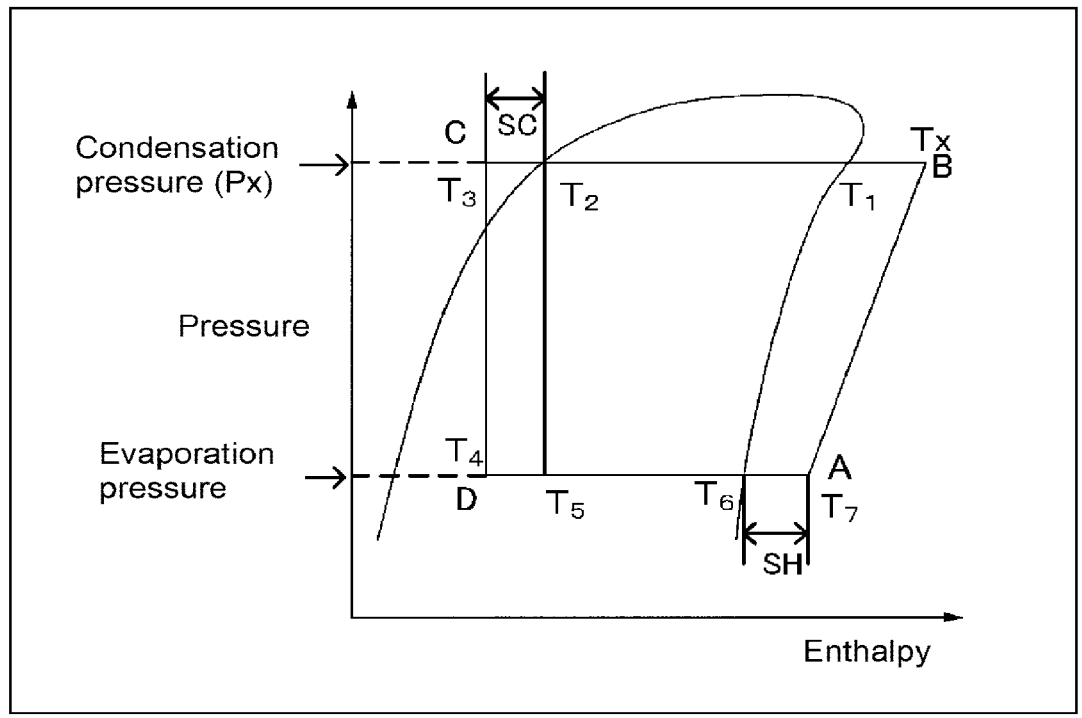
FIG. 2 is a cycle diagram illustrating the state change of the working fluid for heat cycle in the refrigerating cycle system shown in FIG. 1 on a pressure-enthalpy diagram.

The AB process is a process wherein adiabatic compression is carried out by the compressor 11 to change the high temperature/low pressure working fluid vapor A to a high temperature/high pressure working fluid vapor B, and is represented by the line AB in FIG. 2. As described hereinafter, the working fluid vapor A is introduced to the compressor 11 in a superheated state, and the obtainable working fluid vapor B is also a superheated vapor.

The compressor discharge gas temperature (discharge temperature) is the temperature (Tx) in the state B in FIG. 2 and is the maximum temperature in the refrigerating cycle. The compressor discharge pressure (discharge pressure) is the pressure (Px) in the state B in FIG. 2 and is the maximum pressure in the refrigerating cycle. Since the BC process is isobaric cooling process, the discharge pressure is the same as the condensation pressure. Accordingly, in FIG. 2, the condensation pressure is represented as Px for convenience.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure-enthalpy diagram and the BC line, the intersection point $T_1$ on the high enthalpy side is the condensing temperature, and the intersection point $T_2$ on the low enthalpy side is the condensation boiling point temperature. In a case where the working fluid is a non-azeotropic mixture fluid, the temperature glide is represented by a difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercooling degree (SC) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 2. The pressure in this process is the evaporation pressure. Of the two intersection points of the pressure-enthalpy diagram and the DA line, the intersection point $T_6$ on the high enthalpy side is the evaporation temperature. $T_7$-$T_6$ corresponds to the degree of superheat (SH) of the working fluid in the cycle of (i) to (iv), where $T_7$ is the temperature of the working fluid vapor A. $T_4$ indicates the temperature of the working fluid D.

Q and COP of the working fluid are obtained respectively in accordance with the following formulae (11) and (12) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid. It is assumed that there is no loss in the equipment efficiency and no pressure loss in the pipelines and heat exchangers.

The thermodynamic properties required for calculation of the cycle performance of the working fluid are calculated based on the generalized equation of state (Soave-Redlich-Kwong equation) based on the law of corresponding state and various thermodynamic equations. If a characteristic value is not available, it is calculated employing an estimation technique based on a group contribution method.

$$Q = h_A - h_D \tag{11}$$

$$COP = Q/\text{compression work} = (h_A - h_D)/(h_B - h_A) \tag{12}$$

Q represented by the above ($h_A$-$h_D$) corresponds to the output (kW) of the refrigerating cycle, and the compression work represented by ($h_B$-$h_A$), for example, an electric energy required to operate a compressor, corresponds to the power (kW) consumed. Further, Q means a capacity to freeze a load fluid, and a higher Q means that more works can be done in the same system. In other words, it means that with a working fluid having a higher Q, the desired performance can be obtained with a smaller amount, whereby the system can be downsized.

As the heat cycle system to which the composition for a heat cycle system of the present embodiment is applied, a heat cycle system by heat exchangers such as a condenser and an evaporator may be used without any particular restriction. The heat cycle system, for example, refrigerating cycle, has a mechanism in which a gaseous working fluid is compressed by a compressor and cooled by a condenser to form a high pressure liquid, the pressure of the liquid is lowered by an expansion valve, and the liquid is vaporized at low temperature by an evaporator so that heat is removed by the heat of vaporization.

The composition for a heat cycle system of the present invention contains, in addition to the above working fluid, a refrigerant oil, in the same manner as a conventional composition for a heat cycle system. The composition for a heat cycle system comprising the working fluid and a refrigerant oil may further contain known additives such as a stabilizer and a leak detecting substance.

<Incombustibility>

The composition for a heat cycle system according the present embodiment is preferably incombustible. Whether the composition is incombustible or not can be evaluated by the following combustibility test with respect to the working fluid contained.

Combustibility can be evaluated by equipment as defined in ASTM E-681. The respective working fluids are mixed at predetermined proportions to obtain a working fluid to be evaluated, and the obtained working fluid is mixed with the air at a predetermined proportion. Mixing with the air is conducted so that the proportion of the working fluid is every 1 mass % within a range of from 10 to 90 mass %, and the combustibility when an equilibrium state is achieved is evaluated.

A flask having an internal capacity of 12 liter placed in a constant temperature chamber controlled to a temperature of 25° C. is evacuated of air, and the working fluid mixed with the air at the above proportion is enclosed to the atmospheric pressure. Then, in a gaseous phase in the vicinity of the center in the flask, the working fluid was ignited by spark ignition under 15 kV at 30 mA for 0.4 second, and flame propagation is visually confirmed. In a case where the angle of upward flame propagation is at least 90°, the working fluid is rated as being combustible, and in a case where the angle is less than 90°, the working fluid is rated as being incombustible.

<Refrigerant Oil>

As a refrigerant oil, a known refrigerant oil which has been used for the composition for a heat cycle system together with a conventional working fluid comprising a halogenated hydrocarbon may be used without any particular restrictions. The refrigerant oil may, for example, be specifically an oxygen-containing synthetic oil (such as an ester refrigerant oil or an ether refrigerant oil), a fluorinated refrigerant oil, a mineral refrigerant oil or a hydrocarbon synthetic oil.

The ester refrigerant oil may, for example, be a dibasic acid ester oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). The dibasic acid ester oil may, for example, be specifically ditridecyl glutarate, di(2-ethylhexyl) adipate, diisodecyl adipate, ditridecyl adipate or di(3-ethylhexyl) sebacate.

The polyol ester oil is preferably an ester of a diol (such as ethylene glycol, 1,3-propanediol, propylene glycol, 1,4-butanediol, 1,2-butandiol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, with a monohydric alcohol and a polyol. The fatty acid, the dibasic acid, the monohydric alcohol and the polyol may be as defined above.

The polyol carbonate oil is an ester of carbonic acid with a polyol. The polyol may be the above-described diol or the above-described polyol. Further, the polyol carbonate oil may be a ring-opening polymer of a cyclic alkylene carbonate.

The ether refrigerant oil may be a polyvinyl ether oil or a polyoxyalkylene oil.

The polyvinyl ether oil may be a polymer obtained by polymerizing a vinyl ether monomer such as an alkyl vinyl ether, or a copolymer obtained by copolymerizing a vinyl ether monomer and a hydrocarbon monomer having an olefinic double bond.

The vinyl ether monomer may be used alone or in combination of two or more.

The hydrocarbon monomer having an olefinic double bond may, for example, be ethylene, propylene, a butene, a pentene, a hexene, a heptene, an octene, diisobutylene, triisobutylene, styrene, α-methylstyrene or an alkyl-substituted styrene. The hydrocarbon monomer having an olefinic double bond may be used alone or in combination of two or more.

The polyvinyl ether copolymer may be either of a block copolymer and a random copolymer. The polyvinyl ether oil may be used alone or in combination of two or more.

The polyoxyalkylene oil may, for example, be a polyoxyalkylene monool, a polyoxyalkylene polyol, an alkyl ether of a polyoxyalkylene monool or a polyoxyalkylene polyol, or an ester of a polyoxyalkylene monool or a polyoxyalkylene polyol.

The polyoxyalkylene monool or the polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator to be used for the reaction may, for example, be water, a monohydric alcohol such as methanol or butanol, or a polyhydric alcohol such as ethylene glycol, propylene glycol, pentaerythritol or glycerol.

The polyoxyalkylene oil is preferably an alkyl ether or ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyglycol oil.

The fluorinated refrigerant oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral refrigerant oil may, for example, be a naphthene mineral oil or a paraffin mineral oil obtained by purifying a refrigerant oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon synthetic oil may, for example, be a poly-α-olefin, an alkylbenzene or an alkylnaphthalene.

The refrigerant oil may be used alone or in combination of two or more.

The refrigerant oil is preferably at least one member selected from a polyol ester oil, a polyvinyl ether oil and a polyglycol oil in view of compatibility with the working fluid.

The content of the refrigerant oil in the composition for a heat cycle system is not limited so long as it is within a range not to remarkably decrease the effects of the present invention, and is preferably from 10 to 100 parts by mass, more preferably from 20 to 50 parts by mass, per 100 parts by mass of the working fluid.

<Other Optional Component>

The stabilizer optionally contained in the composition for a heat cycle system is a component which improves the stability of the working fluid against heat and oxidation. As the stabilizer, a known stabilizer which has been used for a heat cycle system together with a working fluid comprising a halogenated hydrocarbon, for example, an oxidation resistance-improving agent, a heat resistance-improving agent or a metal deactivator, may be used without any particular restrictions.

The oxidation resistance-improving agent and the heat resistance-improving agent may, for example, be N,N'-diphenylphenylenediamine, p-octyldiphenylamine, p,p'-dioctyldiphenylam ine, N-phenyl-1-naphthyamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). Each of the oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzimidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The content of the stabilizer in the composition for a heat cycle system is not limited so long as it is within a range not to remarkably decrease the effects of the present invention, and is preferably at most 5 parts by mass, more preferably at most 1 part by mass per 100 parts by mass of the working fluid.

The leak detecting substance optionally contained in the composition for a heat cycle system may, for example, be an ultraviolet fluorescent dye, an odor gas or an odor masking agent.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-H10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The content of the leak detecting substance in the composition for a heat cycle system is not particularly limited within a range not to remarkably decrease the effects of the present invention, and is preferably at most 2 parts by mass, more preferably at most 0.5 part by mass per 100 parts by mass of the working fluid.

[Heat Cycle System]

The heat cycle system according to the present embodiment is a system employing a composition for a heat cycle system according to the present embodiment. The heat cycle system according to the present embodiment may be a heat pump system utilizing heat obtained by a condenser or may be a refrigerating cycle system utilizing coldness obtained by an evaporator.

The heat cycle system according to the present embodiment may, for example, be specifically a refrigerating apparatus, an air-conditioning apparatus, a power generation system, a heat transfer apparatus or a secondary cooling machine. Among them, the heat cycle system of the present invention, which stably and safely exhibits heat cycle performance in a working environment at higher temperature, is preferably employed as an air-conditioning apparatus to be disposed outdoors in many cases. Further, the heat cycle system according to the present embodiment is preferably employed also for a refrigerating apparatus.

The air-conditioning apparatus may, for example, be specifically a room air-conditioner, a package air-conditioner (such as a store package air-conditioner, a building package air-conditioner or a plant package air-conditioner), a gas engine heat pump, a train air-conditioning system or an automobile air-conditioning system.

The refrigerating apparatus may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system according to the present embodiment may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the refrigerant oil, deterioration of materials by an acid component formed in the cycle, formation of contaminants, etc. may arise. Particularly, if the refrigerant oil is a polyglycol oil or a polyol ester oil, it has extremely high moisture absorbing properties and is likely to undergo hydrolysis, and inclusion of moisture decreases properties of the refrigerant oil and may be a great cause to impair the long term reliability of a compressor. Accordingly, in order to suppress hydrolysis of the refrigerant oil, it is necessary to control the moisture concentration in the heat cycle system.

As a method of controlling the moisture concentration in the heat cycle system, a method of using a moisture-removing means such as a desiccating agent (for example, silica gel, activated aluminum or zeolite) may be mentioned. The desiccating agent is preferably brought into contact with the composition for a heat cycle system in a liquid state, in view of the dehydration efficiency. For example, the desiccating agent is preferably located at the outlet of the condenser 12 or the inlet of the evaporator 14 to be brought into contact with the composition for a heat cycle system.

The desiccating agent is preferably a zeolite desiccating agent in view of chemical reactivity of the desiccating agent with the composition for a heat cycle system, and the moisture absorption capacity of the desiccating agent.

According to the above-described heat cycle system of the present invention, which employs the working fluid of the present invention, high safety is achieved, practically sufficient heat cycle performance can be obtained while suppressing influence over global warming, and there is substantially no problem with respect to the temperature glide.

EXAMPLES

Now, the present invention will be described in further detail with reference to Examples. However, it should be understood that the present invention is by no means restricted to such specific Examples.

Ex. 1-1 to 1-11

In Ex. 1-1 to 1-11, a working fluid comprising HFO-1123 and $CF_3I$ mixed in a proportion as identified in Table 3 was prepared. By the above method, the temperature glide, the discharge temperature difference and the refrigerating cycle performance (relative refrigerating capacity and relative coefficient of performance) were measured and calculated, and the results are shown in Table 3.

TABLE 3

| | Working fluid composition [mass %] | | | Evaluation | | | | |
| | | | | | (Relative to R410A) | | | |
| | HFO-1123 | $CF_3I$ | GWP | Temperature glide [° C.] | Relative COP | Relative capacity | Discharge pressure difference [kPa] | Discharge temperature difference [° C.] |
|---|---|---|---|---|---|---|---|---|
| Ex. 1-1 | 100 | 0 | 1 | 0.0 | 0.94 | 1.12 | 656 | −8.8 |
| Ex. 1-2 | 90 | 10 | 1 | 3.2 | 0.95 | 1.05 | 401 | −6.2 |
| Ex. 1-3 | 80 | 20 | 1 | 6.2 | 0.97 | 0.99 | 143 | −4.1 |
| Ex. 1-4 | 70 | 30 | 1 | 8.6 | 0.99 | 0.92 | −114 | −2.2 |
| Ex. 1-5 | 60 | 40 | 1 | 10.6 | 1.01 | 0.86 | −367 | −0.7 |
| Ex. 1-6 | 50 | 50 | 1 | 12.0 | 1.03 | 0.78 | −617 | 0.5 |
| Ex. 1-7 | 40 | 60 | 1 | 12.6 | 1.05 | 0.71 | −866 | 1.3 |
| Ex. 1-8 | 30 | 70 | 1 | 12.2 | 1.07 | 0.63 | −1115 | 1.7 |
| Ex. 1-9 | 20 | 80 | 1 | 10.4 | 1.08 | 0.54 | −1368 | 1.4 |
| Ex. 1-10 | 10 | 90 | 1 | 6.8 | 1.09 | 0.44 | −1628 | −0.2 |
| Ex. 1-11 | 0 | 100 | 1 | 0.0 | 1.10 | 0.34 | −1899 | −4.1 |

With respect to working fluids containing the respective compounds as identified in Table 4 singly, the temperature glide, the discharge temperature difference and the refrigerating cycle performance (relative refrigerating capacity and relative coefficient of performance) were measured and calculated, and the results are as follows.

TABLE 4

| | | Evaluation | | | |
| | | | (Relative to R410A) | | |
| Working fluid | GWP | Temperature glide [° C.] | Relative COP | Relative capacity | Discharge pressure difference [kPa] | Discharge temperature difference [° C.] |
|---|---|---|---|---|---|---|
| HFO-1123 | 1 | 0.0 | 0.94 | 1.12 | 656 | −8.8 |
| $CF_3I$ | 1 | 0.0 | 1.10 | 0.34 | −1899 | −4.1 |
| HFC-32 | 677 | 0.0 | 1.00 | 1.07 | 65 | 15.8 |
| HFC-125 | 3170 | 0.0 | 0.99 | 0.77 | −469 | −17.1 |
| HFC-134a | 1300 | 0.0 | 1.08 | 0.45 | −1570 | −11.8 |
| HFO-1234ze(E) | 1 | 0.0 | 1.09 | 0.34 | −1854 | −17.5 |

TABLE 4-continued

| Working fluid | GWP | Temperature glide [° C.] | Relative COP | Relative capacity | Discharge pressure difference [kPa] | Discharge temperature difference [° C.] |
|---|---|---|---|---|---|---|
| | | | Evaluation (Relative to R410A) | | | |
| Propane | 3 | 0.0 | 1.06 | 0.58 | −1195 | −12.4 |
| HFO-161 | 4 | 0.0 | 1.07 | 0.61 | −1190 | 0.1 |
| HFO-1234yf | 1 | 0.0 | 1.07 | 0.43 | −1576 | −20.0 |
| HFO-1132(E) | 1 | 0.0 | 1.02 | 0.87 | −454 | 9.8 |
| HFO-1132(Z) | 1 | 0.0 | 1.10 | 0.46 | −1594 | 5.2 |

Ex. 1-12 to 1-50

In Ex. 1-12 to 1-50, a working fluid comprising, in addition to HFO-1123 and $CF_3I$, HFO-1132(E) in a proportion as identified in Table 5 was prepared. By the above method, the temperature glide, the discharge temperature difference and the refrigerating cycle performance (relative refrigerating capacity and relative coefficient of performance) were measured and calculated, and the results are shown in Table 5.

TABLE 5

| | Working fluid composition [mass %] | | | | Temperature glide [° C.] | Relative COP | Relative capacity | Discharge pressure difference [kPa] | Discharge temperature difference [° C.] |
|---|---|---|---|---|---|---|---|---|---|
| | HFO-1123 | $CF_3I$ | HFO-1132(E) | GWP | | Evaluation (Relative to R410A) | | | |
| Ex. 1-12 | 90 | 10 | 0 | 1 | 3.2 | 0.95 | 1.05 | 401 | −6.2 |
| Ex. 1-13 | 80 | 10 | 10 | 1 | 3.3 | 0.95 | 1.05 | 363 | −4.4 |
| Ex. 1-14 | 70 | 10 | 20 | 1 | 3.5 | 0.96 | 1.03 | 293 | −2.4 |
| Ex. 1-15 | 60 | 10 | 30 | 1 | 3.8 | 0.96 | 1.02 | 200 | −0.3 |
| Ex. 1-16 | 50 | 10 | 40 | 1 | 4.0 | 0.97 | 0.99 | 90 | 1.9 |
| Ex. 1-17 | 40 | 10 | 50 | 1 | 4.0 | 0.98 | 0.97 | −28 | 4.0 |
| Ex. 1-18 | 30 | 10 | 60 | 1 | 3.8 | 0.99 | 0.94 | −152 | 6.1 |
| Ex. 1-19 | 20 | 10 | 70 | 1 | 3.3 | 1.00 | 0.91 | −277 | 7.9 |
| Ex. 1-20 | 10 | 10 | 80 | 1 | 2.4 | 1.01 | 0.88 | −404 | 9.5 |
| Ex. 1-21 | 80 | 20 | 0 | 1 | 6.2 | 0.97 | 0.99 | 143 | −4.1 |
| Ex. 1-22 | 70 | 20 | 10 | 1 | 6.4 | 0.97 | 0.98 | 102 | −2.0 |
| Ex. 1-23 | 60 | 20 | 20 | 1 | 6.6 | 0.97 | 0.97 | 31 | 0.2 |
| Ex. 1-24 | 50 | 20 | 30 | 1 | 6.7 | 0.98 | 0.95 | −60 | 2.4 |
| Ex. 1-25 | 40 | 20 | 40 | 1 | 6.6 | 0.99 | 0.93 | −163 | 4.5 |
| Ex. 1-26 | 30 | 20 | 50 | 1 | 6.1 | 1.00 | 0.90 | −272 | 6.4 |
| Ex. 1-27 | 20 | 20 | 60 | 1 | 5.2 | 1.01 | 0.88 | −384 | 8.1 |
| Ex. 1-28 | 10 | 20 | 70 | 1 | 3.9 | 1.01 | 0.85 | −498 | 9.6 |
| Ex. 1-29 | 70 | 30 | 0 | 1 | 8.6 | 0.99 | 0.92 | −114 | −2.2 |
| Ex. 1-30 | 60 | 30 | 10 | 1 | 8.9 | 0.99 | 0.92 | −157 | 0.2 |
| Ex. 1-31 | 50 | 30 | 20 | 1 | 9.0 | 0.99 | 0.90 | −226 | 2.4 |
| Ex. 1-32 | 40 | 30 | 30 | 1 | 8.8 | 1.00 | 0.88 | −310 | 4.5 |
| Ex. 1-33 | 30 | 30 | 40 | 1 | 8.2 | 1.01 | 0.86 | −402 | 6.4 |
| Ex. 1-34 | 20 | 30 | 50 | 1 | 7.1 | 1.02 | 0.84 | −500 | 8.1 |
| Ex. 1-35 | 10 | 30 | 60 | 1 | 5.4 | 1.02 | 0.81 | −601 | 9.5 |
| Ex. 1-36 | 60 | 40 | 0 | 1 | 10.6 | 1.01 | 0.86 | −367 | −0.7 |
| Ex. 1-37 | 50 | 40 | 10 | 1 | 10.9 | 1.01 | 0.85 | −408 | 1.8 |
| Ex. 1-38 | 40 | 40 | 20 | 1 | 10.8 | 1.01 | 0.84 | −470 | 4.0 |
| Ex. 1-39 | 30 | 40 | 30 | 1 | 10.1 | 1.02 | 0.82 | −544 | 6.1 |
| Ex. 1-40 | 20 | 40 | 40 | 1 | 8.8 | 1.03 | 0.80 | −626 | 7.8 |
| Ex. 1-41 | 10 | 40 | 50 | 1 | 6.9 | 1.03 | 0.77 | −713 | 9.2 |
| Ex. 1-42 | 50 | 50 | 0 | 1 | 12.0 | 1.03 | 0.78 | −617 | 0.5 |
| Ex. 1-43 | 40 | 50 | 10 | 1 | 12.2 | 1.03 | 0.78 | −651 | 3.0 |
| Ex. 1-44 | 30 | 50 | 20 | 1 | 11.7 | 1.04 | 0.77 | −703 | 5.2 |
| Ex. 1-45 | 20 | 50 | 30 | 1 | 10.4 | 1.04 | 0.75 | −765 | 7.1 |
| Ex. 1-46 | 10 | 50 | 40 | 1 | 8.3 | 1.04 | 0.73 | −836 | 8.5 |
| Ex. 1-47 | 40 | 60 | 0 | 1 | 12.6 | 1.05 | 0.71 | −866 | 1.3 |
| Ex. 1-48 | 30 | 60 | 10 | 1 | 12.6 | 1.05 | 0.71 | −886 | 3.8 |
| Ex. 1-49 | 20 | 60 | 20 | 1 | 11.6 | 1.06 | 0.70 | −922 | 5.9 |
| Ex. 1-50 | 10 | 60 | 30 | 1 | 9.6 | 1.06 | 0.69 | −973 | 7.5 |

Ex. 1-51 to 1-89

In Ex. 1-51 to 1-89, a working fluid comprising, in addition to HFO-1123 and $CF_3I$, HFO-1132(Z) in a proportion as identified in Table 6 was prepared. By the above method, the temperature glide, the discharge temperature difference and the refrigerating cycle performance (relative refrigerating capacity and relative coefficient of performance) were measured and calculated, and the results are shown in Table 6.

TABLE 6

| | Working fluid composition [mass %] | | | | Temperature glide | Evaluation (Relative to R410A) | | Discharge pressure difference | Discharge temperature difference |
|---|---|---|---|---|---|---|---|---|---|
| | HFO-1123 | $CF_3I$ | HFO-1132(Z) | GWP | [° C.] | Relative COP | Relative capacity | [kPa] | [° C.] |
| Ex. 1-51 | 90 | 10 | 0 | 1 | 3.2 | 0.95 | 1.05 | 401 | −6.2 |
| Ex. 1-52 | 80 | 10 | 10 | 1 | 5.4 | 0.97 | 0.98 | 85 | −3.3 |
| Ex. 1-53 | 70 | 10 | 20 | 1 | 8.0 | 1.00 | 0.90 | −218 | −0.2 |
| Ex. 1-54 | 60 | 10 | 30 | 1 | 10.0 | 1.02 | 0.83 | −489 | 2.5 |
| Ex. 1-55 | 50 | 10 | 40 | 1 | 11.1 | 1.05 | 0.76 | −724 | 0.6 |
| Ex. 1-56 | 40 | 10 | 50 | 1 | 11.1 | 1.07 | 0.70 | −930 | 1.1 |
| Ex. 1-57 | 30 | 10 | 60 | 1 | 9.9 | 1.08 | 0.64 | −1113 | 1.2 |
| Ex. 1-58 | 20 | 10 | 70 | 1 | 7.6 | 1.09 | 0.58 | −1280 | 0.6 |
| Ex. 1-59 | 10 | 10 | 80 | 1 | 4.2 | 1.09 | 0.52 | −1439 | −0.8 |
| Ex. 1-60 | 80 | 20 | 0 | 1 | 6.2 | 0.97 | 0.99 | 143 | −4.1 |
| Ex. 1-61 | 70 | 20 | 10 | 1 | 8.7 | 0.99 | 0.91 | −177 | −0.9 |
| Ex. 1-62 | 60 | 20 | 20 | 1 | 10.9 | 1.02 | 0.83 | −467 | 2.0 |
| Ex. 1-63 | 50 | 20 | 30 | 1 | 12.2 | 1.04 | 0.76 | −718 | 4.2 |
| Ex. 1-64 | 40 | 20 | 40 | 1 | 12.2 | 1.06 | 0.70 | −932 | 5.8 |
| Ex. 1-65 | 30 | 20 | 50 | 1 | 11.0 | 1.08 | 0.64 | −1118 | 6.8 |
| Ex. 1-66 | 20 | 20 | 60 | 1 | 8.4 | 1.09 | 0.58 | −1286 | 7.2 |
| Ex. 1-67 | 10 | 20 | 70 | 1 | 4.6 | 1.09 | 0.52 | −1443 | 6.7 |
| Ex. 1-68 | 70 | 30 | 0 | 1 | 8.6 | 0.99 | 0.92 | −114 | −2.2 |
| Ex. 1-69 | 60 | 30 | 10 | 1 | 11.1 | 1.01 | 0.84 | −429 | 1.0 |
| Ex. 1-70 | 50 | 30 | 20 | 1 | 12.8 | 1.04 | 0.77 | −700 | 3.5 |
| Ex. 1-71 | 40 | 30 | 30 | 1 | 13.1 | 1.06 | 0.70 | −928 | 5.3 |
| Ex. 1-72 | 30 | 30 | 40 | 1 | 12.0 | 1.08 | 0.64 | −1120 | 6.4 |
| Ex. 1-73 | 20 | 30 | 50 | 1 | 9.3 | 1.09 | 0.58 | −1290 | 6.8 |
| Ex. 1-74 | 10 | 30 | 60 | 1 | 5.1 | 1.09 | 0.52 | −1447 | 6.2 |
| Ex. 1-75 | 60 | 40 | 0 | 1 | 10.6 | 1.01 | 0.86 | −367 | −0.7 |
| Ex. 1-76 | 50 | 40 | 10 | 1 | 12.9 | 1.04 | 0.78 | −668 | 2.3 |
| Ex. 1-77 | 40 | 40 | 20 | 1 | 13.7 | 1.06 | 0.71 | −915 | 4.4 |
| Ex. 1-78 | 30 | 40 | 30 | 1 | 12.8 | 1.08 | 0.64 | −1118 | 5.7 |
| Ex. 1-79 | 20 | 40 | 40 | 1 | 10.1 | 1.09 | 0.58 | −1293 | 6.2 |
| Ex. 1-80 | 10 | 40 | 50 | 1 | 5.6 | 1.09 | 0.52 | −1452 | 5.6 |
| Ex. 1-81 | 50 | 50 | 0 | 1 | 12.0 | 1.03 | 0.78 | −617 | 0.5 |
| Ex. 1-82 | 40 | 50 | 10 | 1 | 13.6 | 1.06 | 0.71 | −893 | 3.1 |
| Ex. 1-83 | 30 | 50 | 20 | 1 | 13.3 | 1.08 | 0.65 | −1113 | 4.7 |
| Ex. 1-84 | 20 | 50 | 30 | 1 | 10.8 | 1.09 | 0.58 | −1295 | 5.4 |
| Ex. 1-85 | 10 | 50 | 40 | 1 | 6.3 | 1.09 | 0.51 | −1457 | 4.9 |
| Ex. 1-86 | 40 | 60 | 0 | 1 | 12.6 | 1.05 | 0.71 | −866 | 1.3 |
| Ex. 1-87 | 30 | 60 | 10 | 1 | 13.3 | 1.08 | 0.64 | −1107 | 3.4 |
| Ex. 1-88 | 20 | 60 | 20 | 1 | 10.4 | 1.09 | 0.57 | −1312 | 5.2 |
| Ex. 1-89 | 10 | 60 | 30 | 1 | 7.0 | 1.10 | 0.51 | −1464 | 4.1 |

Ex. 1-90 to 1-134

In Ex. 1-90 to 1-134, a working fluid comprising, in addition to HFO-1123 and $CF_3I$, HFO-1132(E) and HFO-1132(Z) in a proportion as identified in Table 7 was prepared. By the above method, the temperature glide, the discharge temperature difference and the refrigerating cycle performance (relative refrigerating capacity and relative coefficient of performance) were measured and calculated, and the results are shown in Table 7.

TABLE 7

|  | Working fluid composition [mass %] | | | | | Evaluation | | | | |
|---|---|---|---|---|---|---|---|---|---|---|
|  | | | | | | | (Relative to R410A) | | | |
|  | HFO-1123 | $CF_3I$ | HFO-1132(E) | HFO-1132(Z) | GWP | Temperature glide [° C.] | Relative COP | Relative capacity | Discharge pressure difference [kPa] | Discharge temperature difference [° C.] |
| Ex. 1-90 | 90 | 10 | 0 | 0 | 1 | 3.2 | 0.95 | 1.05 | 401 | −6.2 |
| Ex. 1-91 | 80 | 10 | 0 | 10 | 1 | 5.4 | 0.97 | 0.98 | 85 | −3.3 |
| Ex. 1-92 | 70 | 10 | 10 | 10 | 1 | 5.9 | 0.98 | 0.96 | 26 | −1.1 |
| Ex. 1-93 | 60 | 10 | 20 | 10 | 1 | 6.3 | 0.98 | 0.95 | −53 | 1.1 |
| Ex. 1-94 | 50 | 10 | 30 | 10 | 1 | 6.4 | 0.99 | 0.93 | −146 | 3.2 |
| Ex. 1-95 | 40 | 10 | 40 | 10 | 1 | 6.3 | 1.00 | 0.91 | −247 | 5.2 |
| Ex. 1-96 | 30 | 10 | 50 | 10 | 1 | 5.9 | 1.01 | 0.88 | −353 | 7.0 |
| Ex. 1-97 | 20 | 10 | 60 | 10 | 1 | 5.1 | 1.01 | 0.85 | −462 | 8.7 |
| Ex. 1-98 | 10 | 10 | 70 | 10 | 1 | 3.9 | 1.02 | 0.82 | −574 | 10.2 |
| Ex. 1-99 | 90 | 10 | 0 | 0 | 1 | 3.2 | 0.95 | 1.05 | 401 | −6.2 |
| Ex. 1-100 | 70 | 10 | 0 | 20 | 1 | 8.0 | 1.00 | 0.90 | −218 | −0.2 |
| Ex. 1-101 | 60 | 10 | 10 | 20 | 1 | 8.4 | 1.00 | 0.89 | −282 | 2.0 |
| Ex. 1-102 | 50 | 10 | 20 | 20 | 1 | 8.4 | 1.01 | 0.87 | −359 | 4.0 |
| Ex. 1-103 | 40 | 10 | 30 | 20 | 1 | 8.2 | 1.02 | 0.85 | −444 | 5.9 |
| Ex. 1-104 | 30 | 10 | 40 | 20 | 1 | 7.6 | 1.02 | 0.83 | −535 | 7.6 |
| Ex. 1-105 | 20 | 10 | 50 | 20 | 1 | 6.5 | 1.03 | 0.80 | −630 | 9.1 |
| Ex. 1-106 | 10 | 10 | 60 | 20 | 1 | 5.1 | 1.03 | 0.77 | −729 | 10.4 |
| Ex. 1-107 | 80 | 20 | 0 | 0 | 1 | 6.2 | 0.97 | 0.99 | 143 | −4.1 |
| Ex. 1-108 | 70 | 20 | 0 | 10 | 1 | 8.7 | 0.99 | 0.91 | −177 | −0.9 |
| Ex. 1-109 | 60 | 20 | 10 | 10 | 1 | 9.0 | 0.99 | 0.90 | −232 | 1.3 |
| Ex. 1-110 | 50 | 20 | 20 | 10 | 1 | 9.1 | 1.00 | 0.88 | −305 | 3.4 |
| Ex. 1-111 | 40 | 20 | 30 | 10 | 1 | 8.8 | 1.01 | 0.86 | −388 | 5.4 |
| Ex. 1-112 | 30 | 20 | 40 | 10 | 1 | 8.0 | 1.02 | 0.84 | −478 | 7.2 |
| Ex. 1-113 | 20 | 20 | 50 | 10 | 1 | 6.9 | 1.02 | 0.82 | −573 | 8.7 |
| Ex. 1-114 | 10 | 20 | 60 | 10 | 1 | 5.3 | 1.03 | 0.79 | −671 | 10.0 |
| Ex. 1-115 | 80 | 20 | 0 | 0 | 1 | 6.2 | 0.97 | 0.99 | 143 | −4.1 |
| Ex. 1-116 | 60 | 20 | 0 | 20 | 1 | 10.9 | 1.02 | 0.83 | −467 | 2.0 |
| Ex. 1-117 | 50 | 20 | 10 | 20 | 1 | 10.9 | 1.02 | 0.82 | −523 | 4.0 |
| Ex. 1-118 | 40 | 20 | 20 | 20 | 1 | 10.4 | 1.03 | 0.81 | −589 | 5.9 |
| Ex. 1-119 | 30 | 20 | 30 | 20 | 1 | 9.5 | 1.03 | 0.79 | −663 | 7.5 |
| Ex. 1-120 | 20 | 20 | 40 | 20 | 1 | 8.1 | 1.04 | 0.77 | −743 | 8.9 |
| Ex. 1-121 | 10 | 20 | 50 | 20 | 1 | 6.2 | 1.04 | 0.74 | −828 | 10.1 |
| Ex. 1-122 | 70 | 30 | 0 | 0 | 1 | 8.6 | 0.99 | 0.92 | −114 | −2.2 |
| Ex. 1-123 | 60 | 30 | 0 | 10 | 1 | 11.1 | 1.01 | 0.84 | −429 | 1.0 |
| Ex. 1-124 | 50 | 30 | 10 | 10 | 1 | 11.2 | 1.02 | 0.83 | −478 | 3.2 |
| Ex. 1-125 | 40 | 30 | 20 | 10 | 1 | 10.8 | 1.02 | 0.82 | −541 | 5.2 |
| Ex. 1-126 | 30 | 30 | 30 | 10 | 1 | 10.0 | 1.03 | 0.80 | −613 | 6.9 |
| Ex. 1-127 | 20 | 30 | 40 | 10 | 1 | 8.5 | 1.03 | 0.78 | −692 | 8.5 |
| Ex. 1-128 | 10 | 30 | 50 | 10 | 1 | 6.5 | 1.04 | 0.76 | −776 | 9.7 |
| Ex. 1-129 | 70 | 30 | 0 | 0 | 1 | 8.6 | 0.99 | 0.92 | −114 | −2.2 |
| Ex. 1-130 | 50 | 30 | 0 | 20 | 1 | 12.8 | 1.04 | 0.77 | −700 | 3.5 |
| Ex. 1-131 | 40 | 30 | 10 | 20 | 1 | 12.3 | 1.04 | 0.76 | −745 | 5.4 |
| Ex. 1-132 | 30 | 30 | 20 | 20 | 1 | 11.2 | 1.05 | 0.75 | −800 | 7.1 |
| Ex. 1-133 | 20 | 30 | 30 | 20 | 1 | 9.5 | 1.05 | 0.73 | −864 | 8.5 |
| Ex. 1-134 | 10 | 30 | 40 | 20 | 1 | 7.2 | 1.05 | 0.70 | −935 | 9.5 |

Ex. 2-1 to 2-32

In Ex. 2-1 to 2-32, a working fluid comprising, in addition to HFO-1123 and $CF_3I$, HFO-125 in a proportion as identified in Table 8 was prepared. By the above method, the temperature glide, the discharge temperature difference and the refrigerating cycle performance (relative refrigerating capacity and relative coefficient of performance) were measured and calculated, and the results are shown in Table 8.

TABLE 8

|  | Working fluid composition [mass %] | | | | Evaluation | | | | |
|---|---|---|---|---|---|---|---|---|---|
|  | | | | | | (Relative to R410A) | | | |
|  | HFO-1123 | $CF_3I$ | HFC-125 | GWP | Temperature glide [° C.] | Relative COP | Relative capacity | Discharge pressure difference [kPa] | Discharge temperature difference [° C.] |
| Ex. 2-1 | 60 | 10 | 30 | 952 | 2.6 | 0.96 | 0.98 | 176 | −9.2 |
| Ex. 2-2 | 50 | 10 | 40 | 1269 | 2.4 | 0.97 | 0.95 | 86 | −10.3 |
| Ex. 2-3 | 40 | 10 | 50 | 1586 | 2.2 | 0.97 | 0.92 | −12 | −11.4 |
| Ex. 2-4 | 30 | 10 | 60 | 1902 | 1.8 | 0.97 | 0.89 | −121 | −12.5 |
| Ex. 2-5 | 20 | 10 | 70 | 2219 | 1.4 | 0.98 | 0.85 | −241 | −13.7 |
| Ex. 2-6 | 10 | 10 | 80 | 2536 | 1.0 | 0.99 | 0.81 | −373 | −15.1 |
| Ex. 2-7 | 0 | 10 | 90 | 2853 | 0.2 | 0.99 | 0.76 | −520 | −16.6 |
| Ex. 2-8 | 60 | 20 | 20 | 635 | 5.2 | 0.97 | 0.94 | 9 | −6.6 |
| Ex. 2-9 | 50 | 20 | 30 | 952 | 4.6 | 0.98 | 0.92 | −68 | −8.0 |
| Ex. 2-10 | 40 | 20 | 40 | 1269 | 4.0 | 0.98 | 0.89 | −152 | −9.4 |
| Ex. 2-11 | 30 | 20 | 50 | 1586 | 3.2 | 0.98 | 0.86 | −245 | −10.9 |
| Ex. 2-12 | 20 | 20 | 60 | 1902 | 2.6 | 0.99 | 0.82 | −348 | −12.4 |
| Ex. 2-13 | 10 | 20 | 70 | 2219 | 1.6 | 0.99 | 0.79 | −462 | −14.1 |
| Ex. 2-14 | 0 | 20 | 80 | 2536 | 0.8 | 1.00 | 0.75 | −589 | −15.9 |
| Ex. 2-15 | 60 | 30 | 10 | 318 | 8.0 | 0.99 | 0.90 | −175 | −3.7 |
| Ex. 2-16 | 50 | 30 | 20 | 635 | 7.2 | 0.99 | 0.88 | −241 | −5.3 |
| Ex. 2-17 | 40 | 30 | 30 | 952 | 6.4 | 0.99 | 0.85 | −313 | −7.0 |
| Ex. 2-18 | 30 | 30 | 40 | 1269 | 5.4 | 1.00 | 0.82 | −392 | −8.7 |
| Ex. 2-19 | 20 | 30 | 50 | 1586 | 4.2 | 1.00 | 0.79 | −479 | −10.6 |
| Ex. 2-20 | 10 | 30 | 60 | 1902 | 3.0 | 1.00 | 0.76 | −575 | −12.6 |
| Ex. 2-21 | 0 | 30 | 70 | 2219 | 1.8 | 1.01 | 0.72 | −682 | −14.6 |
| Ex. 2-22 | 50 | 40 | 10 | 318 | 9.8 | 1.01 | 0.83 | −426 | −2.5 |
| Ex. 2-23 | 40 | 40 | 20 | 635 | 8.8 | 1.01 | 0.81 | −489 | −4.3 |
| Ex. 2-24 | 30 | 40 | 30 | 952 | 7.8 | 1.01 | 0.78 | −557 | −6.2 |
| Ex. 2-25 | 20 | 40 | 40 | 1269 | 6.4 | 1.01 | 0.75 | −631 | −8.3 |
| Ex. 2-26 | 10 | 40 | 50 | 1586 | 5.0 | 1.01 | 0.72 | −711 | −10.5 |
| Ex. 2-27 | 0 | 40 | 60 | 1902 | 3.4 | 1.02 | 0.69 | −799 | −12.9 |
| Ex. 2-28 | 40 | 50 | 10 | 318 | 11.0 | 1.03 | 0.76 | −675 | −1.5 |
| Ex. 2-29 | 30 | 50 | 20 | 635 | 10.0 | 1.03 | 0.74 | −735 | −3.6 |
| Ex. 2-30 | 20 | 50 | 30 | 952 | 8.8 | 1.03 | 0.71 | −800 | −5.8 |
| Ex. 2-31 | 10 | 50 | 40 | 1269 | 7.4 | 1.03 | 0.68 | −868 | −8.1 |
| Ex. 2-32 | 0 | 50 | 50 | 1586 | 5.8 | 1.03 | 0.65 | −940 | −10.6 |

Ex. 3-1 to 3-27

In Ex. 3-1 to 3-27, a working fluid comprising, in addition to HFO-1123 and $CF_3I$, HFC-134a in a proportion as identified in Table 9 was prepared. By the above method, the temperature glide, the discharge temperature difference and the refrigerating cycle performance (relative refrigerating capacity and relative coefficient of performance) were measured and calculated, and the results are shown in Table 9.

TABLE 9

| | Working fluid composition [mass %] | | | | Temperature glide [° C.] | Evaluation (Relative to R410A) | | Discharge pressure difference [kPa] | Discharge temperature difference [° C.] |
|---|---|---|---|---|---|---|---|---|---|
| | HFO-1123 | $CF_3I$ | HFC-134a | GWP | | Relative COP | Relative capacity | | |
| Ex. 3-1 | 60 | 10 | 30 | 391 | 6.0 | 1.00 | 0.88 | −258 | −5.6 |
| Ex. 3-2 | 50 | 10 | 40 | 521 | 6.8 | 1.01 | 0.82 | −476 | −5.4 |
| Ex. 3-3 | 40 | 10 | 50 | 651 | 7.4 | 1.03 | 0.75 | −691 | −5.4 |
| Ex. 3-4 | 30 | 10 | 60 | 780 | 7.2 | 1.04 | 0.68 | −902 | −5.8 |
| Ex. 3-5 | 20 | 10 | 70 | 910 | 6.2 | 1.06 | 0.62 | −1109 | −6.7 |
| Ex. 3-6 | 10 | 10 | 80 | 1040 | 4.2 | 1.07 | 0.54 | −1315 | −8.4 |
| Ex. 3-7 | 60 | 20 | 20 | 261 | 6.0 | 1.00 | 0.88 | −257 | −5.1 |
| Ex. 3-8 | 50 | 20 | 30 | 391 | 6.2 | 1.02 | 0.82 | −462 | −5.5 |
| Ex. 3-9 | 40 | 20 | 40 | 521 | 6.2 | 1.03 | 0.76 | −667 | −5.8 |
| Ex. 3-10 | 30 | 20 | 50 | 651 | 6.2 | 1.04 | 0.69 | −873 | −6.2 |
| Ex. 3-11 | 20 | 20 | 60 | 780 | 5.4 | 1.05 | 0.63 | −1078 | −7.1 |
| Ex. 3-12 | 10 | 20 | 70 | 910 | 3.8 | 1.06 | 0.55 | −1281 | −8.5 |
| Ex. 3-13 | 60 | 30 | 10 | 131 | 7.6 | 1.00 | 0.87 | −293 | −3.4 |
| Ex. 3-14 | 50 | 30 | 20 | 261 | 6.8 | 1.02 | 0.82 | −478 | −4.5 |
| Ex. 3-15 | 40 | 30 | 30 | 391 | 6.0 | 1.03 | 0.76 | −667 | −5.5 |
| Ex. 3-16 | 30 | 30 | 40 | 521 | 5.4 | 1.04 | 0.70 | −861 | −6.4 |
| Ex. 3-17 | 20 | 30 | 50 | 651 | 4.4 | 1.05 | 0.63 | −1057 | −7.3 |
| Ex. 3-18 | 10 | 30 | 60 | 780 | 3.2 | 1.06 | 0.56 | −1255 | −8.7 |
| Ex. 3-19 | 50 | 40 | 10 | 131 | 9.4 | 1.03 | 0.08 | −531 | −2.6 |
| Ex. 3-20 | 40 | 40 | 20 | 261 | 7.2 | 1.03 | 0.75 | −700 | −4.1 |
| Ex. 3-21 | 30 | 40 | 30 | 391 | 5.6 | 1.04 | 0.70 | −875 | 5.7 |
| Ex. 3-22 | 20 | 40 | 40 | 521 | 4.0 | 1.05 | 0.63 | −1057 | −7.3 |
| Ex. 3-23 | 10 | 40 | 50 | 651 | 2.4 | 1.06 | 0.57 | −1243 | −8.8 |
| Ex. 3-24 | 40 | 50 | 10 | 131 | 9.6 | 1.04 | 0.73 | −767 | −1.7 |
| Ex. 3-25 | 30 | 50 | 20 | 261 | 7.2 | 1.05 | 0.68 | −923 | −4.0 |
| Ex. 3-26 | 20 | 50 | 30 | 391 | 4.8 | 1.05 | 0.63 | −1085 | −6.2 |
| Ex. 3-27 | 10 | 50 | 40 | 521 | 2.4 | 1.06 | 0.57 | −1253 | −8.5 |

Ex. 4-1 to 4-39

In Ex. 4-1 to 4-39, a working fluid comprising, in addition to HFO-1123 and $CF_3I$, HFC-32 in a proportion as identified in Table 10 was prepared. By the above method, the temperature glide, the discharge temperature difference and the refrigerating cycle performance (relative refrigerating capacity and relative coefficient of performance) were measured and calculated, and the results are shown in Table 10.

TABLE 10

| | Working fluid composition [mass %] | | | | Temperature glide [° C.] | Evaluation (Relative to R410A) | | Discharge pressure difference [kPa] | Discharge temperature difference [° C.] |
|---|---|---|---|---|---|---|---|---|---|
| | HFO-1123 | $CF_3I$ | HFC-32 | GWP | | Relative COP | Relative capacity | | |
| Ex. 4-1 | 60 | 10 | 30 | 204 | 0.8 | 0.97 | 1.14 | 519 | −0.6 |
| Ex. 4-2 | 50 | 10 | 40 | 271 | 0.6 | 0.97 | 1.14 | 483 | 1.7 |
| Ex. 4-3 | 40 | 10 | 50 | 339 | 0.6 | 0.98 | 1.14 | 424 | 4.2 |
| Ex. 4-4 | 30 | 10 | 60 | 407 | 0.6 | 0.98 | 1.13 | 350 | 6.8 |
| Ex. 4-5 | 20 | 10 | 70 | 474 | 0.6 | 0.99 | 1.11 | 267 | 9.4 |

TABLE 10-continued

| | Working fluid composition [mass %] | | | | Temperature glide [° C.] | Evaluation (Relative to R410A) | | Discharge pressure difference [kPa] | Discharge temperature difference [° C.] |
|---|---|---|---|---|---|---|---|---|---|
| | HFO-1123 | CF$_3$I | HFC-32 | GWP | | Relative COP | Relative capacity | | |
| Ex. 4-6 | 10 | 10 | 80 | 542 | 0.4 | 0.99 | 1.09 | 179 | 12.0 |
| Ex. 4-7 | 0 | 10 | 90 | 609 | 0.2 | 1.00 | 1.07 | 88 | 14.6 |
| Ex. 4-8 | 60 | 20 | 20 | 136 | 3.0 | 0.97 | 1.08 | 350 | −0.9 |
| Ex. 4-9 | 50 | 20 | 30 | 204 | 1.6 | 0.97 | 1.10 | 377 | 0.6 |
| Ex. 4-10 | 40 | 20 | 40 | 271 | 0.8 | 0.98 | 1.11 | 365 | 2.6 |
| Ex. 4-11 | 30 | 20 | 50 | 339 | 0.4 | 0.98 | 1.11 | 324 | 5.0 |
| Ex. 4-12 | 20 | 20 | 60 | 407 | 0.4 | 0.99 | 1.10 | 262 | 7.6 |
| Ex. 4-13 | 10 | 20 | 70 | 474 | 0.2 | 0.99 | 1.09 | 188 | 10.4 |
| Ex. 4-14 | 0 | 20 | 80 | 542 | 0.2 | 1.00 | 1.07 | 106 | 13.2 |
| Ex. 4-15 | 60 | 30 | 10 | 69 | 6.8 | 0.98 | 0.98 | 61 | −0.4 |
| Ex. 4-16 | 50 | 30 | 20 | 136 | 4.6 | 0.97 | 1.02 | 176 | 0.9 |
| Ex. 4-17 | 40 | 30 | 30 | 204 | 2.6 | 0.98 | 1.06 | 237 | 2.1 |
| Ex. 4-18 | 30 | 30 | 40 | 271 | 1.2 | 0.98 | 1.08 | 251 | 3.7 |
| Ex. 4-19 | 20 | 30 | 50 | 339 | 0.4 | 0.99 | 1.08 | 228 | 5.9 |
| Ex. 4-20 | 10 | 30 | 60 | 407 | 0.2 | 0.99 | 1.08 | 180 | 8.6 |
| Ex. 4-21 | 0 | 30 | 70 | 474 | 0.0 | 0.99 | 1.06 | 115 | 11.6 |
| Ex. 4-22 | 50 | 40 | 10 | 69 | 9.0 | 0.99 | 0.92 | −152 | 1.6 |
| Ex. 4-23 | 40 | 40 | 20 | 136 | 6.4 | 0.98 | 0.97 | 1 | 3.0 |
| Ex. 4-24 | 30 | 40 | 30 | 204 | 3.8 | 0.98 | 1.01 | 98 | 3.9 |
| Ex. 4-25 | 20 | 40 | 40 | 271 | 1.6 | 0.98 | 1.04 | 142 | 5.0 |
| Ex. 4-26 | 10 | 40 | 50 | 339 | 0.4 | 0.99 | 1.05 | 140 | 6.9 |
| Ex. 4-27 | 0 | 40 | 60 | 407 | 0.0 | 0.99 | 1.05 | 105 | 9.8 |
| Ex. 4-28 | 40 | 50 | 10 | 69 | 11.4 | 1.00 | 0.86 | −361 | 3.6 |
| Ex. 4-29 | 30 | 50 | 20 | 136 | 8.6 | 0.98 | 0.92 | −172 | 5.4 |
| Ex. 4-30 | 20 | 50 | 30 | 204 | 5.2 | 0.97 | 0.96 | −37 | 6.3 |
| Ex. 4-31 | 10 | 50 | 40 | 271 | 2.2 | 0.98 | 1.01 | 39 | 6.7 |
| Ex. 4-32 | 0 | 50 | 50 | 339 | 0.4 | 0.99 | 1.03 | 60 | 8.2 |
| Ex. 4-33 | 30 | 60 | 10 | 69 | 13.8 | 1.02 | 0.81 | −564 | 5.6 |
| Ex. 4-34 | 20 | 60 | 20 | 136 | 11.2 | 0.99 | 0.87 | −340 | 8.0 |
| Ex. 4-35 | 10 | 60 | 30 | 204 | 8.6 | 0.99 | 0.94 | −167 | 8.5 |
| Ex. 4-36 | 0 | 60 | 40 | 271 | 4.8 | 1.00 | 1.00 | −52 | 8.0 |
| Ex. 4-38 | 10 | 70 | 20 | 136 | 14.2 | 0.99 | 0.82 | −502 | 11.0 |
| Ex. 4-39 | 0 | 70 | 30 | 204 | 12.8 | 1.01 | 0.91 | −290 | 11.3 |

Ex. 4-40 to 4-120

In Ex. 4-40 to 4-120, a working fluid comprising, in addition to HFO-1123 and CF$_3$I, HFC-32 and HFO-1132(E) in a proportion as identified in Table 11 or 12 was prepared. By the above method, the temperature glide, the discharge temperature difference and the refrigerating cycle performance (relative refrigerating capacity and relative coefficient of performance) were measured and calculated, and the results are shown in Tables 11 and 12.

TABLE 11

| | Working fluid composition [mass %] | | | | | Temperature glide [° C.] | Evaluation (Relative to R410A) | | Discharge pressure difference [kPa] | Discharge temperature difference [° C.] |
|---|---|---|---|---|---|---|---|---|---|---|
| | HFO-1123 | CF$_3$I | HFC-32 | HFO-1132(E) | GWP | | Relative COP | Relative capacity | | |
| Ex. 4-40 | 80 | 10 | 10 | 0 | 68.6 | 2.4 | 0.95 | 1.10 | 506 | −4.5 |
| Ex. 4-41 | 70 | 10 | 10 | 10 | 68.6 | 2.6 | 0.95 | 1.09 | 455 | −2.5 |
| Ex. 4-42 | 60 | 10 | 10 | 20 | 68.6 | 2.9 | 0.96 | 1.07 | 376 | −0.3 |
| Ex. 4-43 | 50 | 10 | 10 | 30 | 68.6 | 3.2 | 0.96 | 1.05 | 275 | 1.9 |
| Ex. 4-44 | 40 | 10 | 10 | 40 | 68.6 | 3.5 | 0.97 | 1.02 | 160 | 4.2 |
| Ex. 4-45 | 30 | 10 | 10 | 50 | 68.6 | 3.6 | 0.98 | 1.00 | 36 | 6.5 |
| Ex. 4-46 | 20 | 10 | 10 | 60 | 68.6 | 3.5 | 0.99 | 0.97 | −92 | 8.7 |
| Ex. 4-47 | 10 | 10 | 10 | 70 | 68.6 | 3.1 | 1.00 | 0.94 | −223 | 10.7 |
| Ex. 4-48 | 70 | 20 | 10 | 0 | 68.6 | 4.8 | 0.96 | 1.04 | 291 | −2.4 |

TABLE 11-continued

|  | Working fluid composition [mass %] | | | | | Evaluation | | | | |
|---|---|---|---|---|---|---|---|---|---|---|
|  | | | | | | | (Relative to R410A) | | | |
|  | | | | | | Temperature | | | Discharge pressure | Discharge temperature |
|  | HFO-1123 | CF$_3$I | HFC-32 | HFO-1132(E) | GWP | glide [° C.] | Relative COP | Relative capacity | difference [kPa] | difference [° C.] |
| Ex. 4-49 | 60 | 20 | 10 | 10 | 68.6 | 5.2 | 0.96 | 1.03 | 232 | −0.1 |
| Ex. 4-50 | 50 | 20 | 10 | 20 | 68.6 | 5.5 | 0.97 | 1.01 | 146 | 2.3 |
| Ex. 4-51 | 40 | 20 | 10 | 30 | 68.6 | 5.7 | 0.97 | 0.99 | 42 | 4.6 |
| Ex. 4-52 | 30 | 20 | 10 | 40 | 68.6 | 5.7 | 0.98 | 0.96 | −72 | 6.9 |
| Ex. 4-53 | 20 | 20 | 10 | 50 | 68.6 | 5.4 | 0.99 | 0.93 | −192 | 9.0 |
| Ex. 4-54 | 10 | 20 | 10 | 60 | 68.6 | 4.7 | 1.00 | 0.90 | −317 | 11.0 |
| Ex. 4-55 | 60 | 30 | 10 | 0 | 68.6 | 6.8 | 0.98 | 0.98 | 61 | −0.4 |
| Ex. 4-56 | 50 | 30 | 10 | 10 | 68.6 | 7.3 | 0.98 | 0.97 | −5 | 2.2 |
| Ex. 4-57 | 40 | 30 | 10 | 20 | 68.6 | 7.6 | 0.98 | 0.95 | −92 | 4.6 |
| Ex. 4-58 | 30 | 30 | 10 | 30 | 68.6 | 7.6 | 0.99 | 0.93 | −194 | 7.0 |
| Ex. 4-59 | 20 | 30 | 10 | 40 | 68.6 | 7.2 | 1.00 | 0.90 | −304 | 9.2 |
| Ex. 4-60 | 10 | 30 | 10 | 50 | 68.6 | 6.4 | 1.01 | 0.87 | −419 | 11.1 |
| Ex. 4-61 | 50 | 40 | 10 | 0 | 68.6 | 9.0 | 0.99 | 0.92 | −152 | 1.6 |
| Ex. 4-62 | 40 | 40 | 10 | 10 | 68.6 | 9.5 | 0.99 | 0.91 | −225 | 4.3 |
| Ex. 4-63 | 30 | 40 | 10 | 20 | 68.6 | 9.5 | 1.00 | 0.89 | −317 | 6.8 |
| Ex. 4-64 | 20 | 40 | 10 | 30 | 68.6 | 9.1 | 1.01 | 0.86 | −421 | 9.0 |
| Ex. 4-65 | 10 | 40 | 10 | 40 | 68.6 | 8.1 | 1.02 | 0.83 | −533 | 11.0 |
| Ex. 4-66 | 40 | 50 | 10 | 0 | 68.6 | 11.4 | 1.00 | 0.86 | −361 | 3.6 |
| Ex. 4-67 | 30 | 50 | 10 | 10 | 68.6 | 11.5 | 1.01 | 0.85 | −445 | 6.3 |
| Ex. 4-68 | 20 | 50 | 10 | 20 | 68.6 | 10.9 | 1.02 | 0.82 | −546 | 8.6 |
| Ex. 4-69 | 10 | 50 | 10 | 30 | 68.6 | 9.7 | 1.03 | 0.79 | −658 | 10.6 |
| Ex. 4-70 | 30 | 60 | 10 | 0 | 68.6 | 13.8 | 1.02 | 0.81 | −564 | 5.6 |
| Ex. 4-71 | 20 | 60 | 10 | 10 | 68.6 | 12.9 | 1.03 | 0.78 | −673 | 8.0 |
| Ex. 4-72 | 10 | 60 | 10 | 20 | 68.6 | 11.1 | 1.05 | 0.75 | −798 | 9.9 |
| Ex. 4-73 | 70 | 10 | 20 | 0 | 136.2 | 1.4 | 0.96 | 1.13 | 550 | −2.8 |
| Ex. 4-74 | 60 | 10 | 20 | 10 | 136.2 | 1.7 | 0.96 | 1.11 | 492 | −0.6 |
| Ex. 4-75 | 50 | 10 | 20 | 20 | 136.2 | 2.1 | 0.96 | 1.09 | 407 | 1.8 |
| Ex. 4-76 | 40 | 10 | 20 | 30 | 136.2 | 2.5 | 0.97 | 1.07 | 302 | 4.2 |
| Ex. 4-77 | 30 | 10 | 20 | 40 | 136.2 | 2.8 | 0.97 | 1.04 | 185 | 6.7 |
| Ex. 4-78 | 20 | 10 | 20 | 50 | 136.2 | 3.1 | 0.98 | 1.02 | 59 | 9.1 |
| Ex. 4-79 | 10 | 10 | 20 | 60 | 136.2 | 3.1 | 0.99 | 0.98 | −72 | 11.5 |

TABLE 12

|  | Working fluid composition [mass %] | | | | | Evaluation | | | | |
|---|---|---|---|---|---|---|---|---|---|---|
|  | | | | | | | (Relative to R410A) | | | |
|  | | | | | | Temperature | | | Discharge pressure | Discharge temperature |
|  | HFO-1123 | CF$_3$I | HFC-32 | HFO-1132(E) | GWP | glide [° C.] | Relative COP | Relative capacity | difference [kPa] | difference [° C.] |
| Ex. 4-80 | 60 | 20 | 20 | 0 | 136.2 | 3.0 | 0.97 | 1.08 | 350 | −0.9 |
| Ex. 4-81 | 50 | 20 | 20 | 10 | 136.2 | 3.6 | 0.97 | 1.06 | 281 | 1.7 |
| Ex. 4-82 | 40 | 20 | 20 | 20 | 136.2 | 4.2 | 0.97 | 1.04 | 187 | 4.4 |
| Ex. 4-83 | 30 | 20 | 20 | 30 | 136.2 | 4.6 | 0.98 | 1.01 | 78 | 7.0 |
| Ex. 4-84 | 20 | 20 | 20 | 40 | 136.2 | 4.8 | 0.98 | 0.98 | −42 | 9.5 |
| Ex. 4-85 | 10 | 20 | 20 | 50 | 136.2 | 4.8 | 0.99 | 0.95 | −169 | 12.0 |
| Ex. 4-86 | 50 | 30 | 20 | 0 | 136.2 | 4.6 | 0.97 | 1.02 | 176 | 0.9 |
| Ex. 4-87 | 40 | 30 | 20 | 10 | 136.2 | 5.5 | 0.98 | 1.00 | 87 | 3.9 |
| Ex. 4-88 | 30 | 30 | 20 | 20 | 136.2 | 6.1 | 0.98 | 0.98 | −22 | 6.8 |
| Ex. 4-89 | 20 | 30 | 20 | 30 | 136.2 | 6.5 | 0.99 | 0.95 | −145 | 9.6 |
| Ex. 4-90 | 10 | 30 | 20 | 40 | 136.2 | 6.5 | 1.00 | 0.92 | −276 | 12.3 |
| Ex. 4-91 | 40 | 40 | 20 | 0 | 136.2 | 6.4 | 0.98 | 0.97 | 1 | 3.0 |
| Ex. 4-92 | 30 | 40 | 20 | 10 | 136.2 | 7.4 | 0.99 | 0.95 | −115 | 6.3 |
| Ex. 4-93 | 20 | 40 | 20 | 20 | 136.2 | 8.0 | 1.00 | 0.92 | −249 | 9.4 |
| Ex. 4-94 | 10 | 40 | 20 | 30 | 136.2 | 8.2 | 1.01 | 0.88 | −395 | 12.3 |
| Ex. 4-95 | 30 | 50 | 20 | 0 | 136.2 | 8.6 | 0.98 | 0.92 | −172 | 5.4 |
| Ex. 4-96 | 20 | 50 | 20 | 10 | 136.2 | 9.4 | 1.00 | 0.88 | −342 | 8.9 |
| Ex. 4-97 | 10 | 50 | 20 | 20 | 136.2 | 9.7 | 1.02 | 0.84 | −529 | 12.1 |
| Ex. 4-98 | 20 | 60 | 20 | 0 | 136.2 | 11.2 | 0.99 | 0.87 | −340 | 8.0 |
| Ex. 4-99 | 10 | 60 | 20 | 10 | 136.2 | 11.0 | 1.04 | 0.79 | −680 | 11.4 |
| Ex. 4-100 | 60 | 10 | 30 | 0 | 203.8 | 0.8 | 0.97 | 1.14 | 519 | −0.6 |
| Ex. 4-101 | 50 | 10 | 30 | 10 | 203.8 | 1.2 | 0.97 | 1.12 | 461 | 1.8 |

TABLE 12-continued

|  | Working fluid composition [mass %] | | | | Temperature | Evaluation (Relative to R410A) | | Discharge pressure | Discharge temperature |
|  | HFO-1123 | CF$_3$I | HFC-32 | HFO-1132(E) | GWP | glide [° C.] | Relative COP | Relative capacity | difference [kPa] | difference [° C.] |
|---|---|---|---|---|---|---|---|---|---|---|
| Ex. 4-102 | 40 | 10 | 30 | 20 | 203.8 | 1.6 | 0.97 | 1.10 | 379 | 4.3 |
| Ex. 4-103 | 30 | 10 | 30 | 30 | 203.8 | 2.1 | 0.97 | 1.08 | 280 | 6.9 |
| Ex. 4-104 | 20 | 10 | 30 | 40 | 203.8 | 2.4 | 0.97 | 1.05 | 168 | 9.5 |
| Ex. 4-105 | 10 | 10 | 30 | 50 | 203.8 | 2.7 | 0.98 | 1.02 | 47 | 12.1 |
| Ex. 4-106 | 50 | 20 | 30 | 0 | 203.8 | 1.6 | 0.97 | 1.10 | 377 | 0.6 |
| Ex. 4-107 | 40 | 20 | 30 | 10 | 203.8 | 2.5 | 0.97 | 1.08 | 295 | 3.7 |
| Ex. 4-108 | 30 | 20 | 30 | 20 | 203.8 | 3.3 | 0.97 | 1.05 | 192 | 6.7 |
| Ex. 4-109 | 20 | 20 | 30 | 30 | 203.8 | 3.9 | 0.98 | 1.02 | 73 | 9.8 |
| Ex. 4-110 | 10 | 20 | 30 | 40 | 203.8 | 4.4 | 0.99 | 0.99 | −56 | 12.8 |
| Ex. 4-111 | 40 | 30 | 30 | 0 | 203.8 | 2.6 | 0.98 | 1.06 | 237 | 2.1 |
| Ex. 4-112 | 30 | 30 | 30 | 10 | 203.8 | 4.0 | 0.98 | 1.03 | 118 | 5.9 |
| Ex. 4-113 | 20 | 30 | 30 | 20 | 203.8 | 5.2 | 0.99 | 0.99 | −20 | 9.6 |
| Ex. 4-114 | 10 | 30 | 30 | 30 | 203.8 | 6.1 | 0.99 | 0.95 | −171 | 13.2 |
| Ex. 4-115 | 30 | 40 | 30 | 0 | 203.8 | 3.8 | 0.98 | 1.01 | 98 | 3.9 |
| Ex. 4-116 | 20 | 40 | 30 | 10 | 203.8 | 5.9 | 0.99 | 0.97 | −92 | 8.7 |
| Ex. 4-117 | 10 | 40 | 30 | 20 | 203.8 | 7.6 | 1.00 | 0.91 | −300 | 13.3 |
| Ex. 4-118 | 20 | 50 | 30 | 0 | 203.8 | 5.2 | 0.97 | 0.96 | −37 | 6.3 |
| Ex. 4-119 | 10 | 50 | 30 | 10 | 203.8 | 8.9 | 1.02 | 0.87 | −447 | 13.1 |
| Ex. 4-120 | 10 | 60 | 30 | 0 | 203.8 | 8.6 | 0.99 | 0.94 | −167 | 8.5 |

Ex. 5-1 to 5-34

In Ex. 5-1 to 5-34, a working fluid comprising, in addition to HFO-1123 and CF$_3$I, HFO-1234yf in a proportion as identified in Table 13 was prepared. By the above method, the temperature glide, the discharge temperature difference and the refrigerating cycle performance (relative refrigerating capacity and relative coefficient of performance) were measured and calculated, and the results are shown in Table 13.

TABLE 13

|  | Working fluid composition [mass %] | | | | Temperature | Evaluation (Relative to R410A) | | Discharge pressure | Discharge temperature |
|  | HFO-1123 | CF$_3$I | HFO-1234yf | GWP | glide [° C.] | Relative COP | Relative capacity | difference [kPa] | difference [° C.] |
|---|---|---|---|---|---|---|---|---|---|
| Ex. 5-1 | 60 | 20 | 20 | 1 | 7.4 | 1.00 | 0.85 | −344 | −5.9 |
| Ex. 5-2 | 50 | 20 | 30 | 1 | 7.4 | 1.02 | 0.78 | −570 | −7.1 |
| Ex. 5-3 | 40 | 20 | 40 | 1 | 7.0 | 1.03 | 0.71 | −786 | −8.6 |
| Ex. 5-4 | 30 | 20 | 50 | 1 | 6.2 | 1.05 | 0.64 | −992 | −10.5 |
| Ex. 5-5 | 20 | 20 | 60 | 1 | 4.8 | 1.06 | 0.58 | −1191 | −12.7 |
| Ex. 5-6 | 10 | 20 | 70 | 1 | 2.8 | 1.06 | 0.51 | −1382 | −15.5 |
| Ex. 5-7 | 0 | 20 | 80 | 1 | 0.0 | 1.07 | 0.44 | −1569 | −18.9 |
| Ex. 5-8 | 60 | 30 | 10 | 1 | 8.6 | 1.01 | 0.86 | −348 | −3.7 |
| Ex. 5-9 | 50 | 30 | 20 | 1 | 8.4 | 1.02 | 0.79 | −573 | −5.3 |
| Ex. 5-10 | 40 | 30 | 30 | 1 | 7.6 | 1.04 | 0.72 | −788 | −7.1 |
| Ex. 5-11 | 30 | 30 | 40 | 1 | 6.6 | 1.05 | 0.65 | −995 | −9.2 |
| Ex. 5-12 | 20 | 30 | 50 | 1 | 5.0 | 1.06 | 0.58 | −1194 | −11.7 |
| Ex. 5-13 | 10 | 30 | 60 | 1 | 2.8 | 1.06 | 0.51 | −1386 | −14.6 |
| Ex. 5-14 | 0 | 30 | 70 | 1 | 0.0 | 1.07 | 0.44 | −1572 | −18.1 |
| Ex. 5-15 | 50 | 40 | 10 | 1 | 9.8 | 1.02 | 0.79 | −588 | −2.8 |
| Ex. 5-16 | 40 | 40 | 20 | 1 | 8.8 | 1.04 | 0.72 | −801 | −5.0 |
| Ex. 5-17 | 30 | 40 | 30 | 1 | 7.2 | 1.05 | 0.65 | −1007 | −7.5 |
| Ex. 5-18 | 20 | 40 | 40 | 1 | 5.4 | 1.06 | 0.58 | −1205 | −10.3 |
| Ex. 5-19 | 10 | 40 | 50 | 1 | 3.0 | 1.07 | 0.51 | −1397 | −13.5 |
| Ex. 5-20 | 0 | 40 | 60 | 1 | 0.0 | 1.07 | 0.44 | −1583 | −17.2 |
| Ex. 5-21 | 40 | 50 | 10 | 1 | 10.4 | 1.04 | 0.71 | −827 | −2.2 |
| Ex. 5-22 | 30 | 50 | 20 | 1 | 8.6 | 1.05 | 0.64 | −1031 | −5.1 |
| Ex. 5-23 | 20 | 50 | 30 | 1 | 6.2 | 1.06 | 0.57 | −1228 | −8.3 |

TABLE 13-continued

| | Working fluid composition [mass %] | | | | Evaluation | | | (Relative to R410A) | |
|---|---|---|---|---|---|---|---|---|---|
| | | | | | | | | Discharge pressure | Discharge temperature |
| | HFO-1123 | CF$_3$I | HFO-1234yf | GWP | Temperature glide [° C.] | Relative COP | Relative capacity | difference [kPa] | difference [° C.] |
| Ex. 5-24 | 10 | 50 | 40 | 1 | 3.4 | 1.07 | 0.50 | −1418 | −12.0 |
| Ex. 5-25 | 0 | 50 | 50 | 1 | 0.2 | 1.08 | 0.43 | −1602 | −16.0 |
| Ex. 5-26 | 30 | 60 | 10 | 1 | 10.2 | 1.06 | 0.64 | −1067 | −2.1 |
| Ex. 5-27 | 20 | 60 | 20 | 1 | 7.4 | 1.07 | 0.56 | −1262 | −5.8 |
| Ex. 5-28 | 10 | 60 | 30 | 1 | 4.2 | 1.07 | 0.49 | −1450 | −9.9 |
| Ex. 5-29 | 0 | 60 | 40 | 1 | 0.6 | 1.08 | 0.42 | −1631 | −14.5 |
| Ex. 5-30 | 20 | 70 | 10 | 1 | 8.8 | 1.07 | 0.55 | −1309 | −2.6 |
| Ex. 5-31 | 10 | 70 | 20 | 1 | 5.2 | 1.08 | 0.48 | −1495 | −7.4 |
| Ex. 5-32 | 0 | 70 | 30 | 1 | 1.2 | 1.08 | 0.41 | −1673 | −12.5 |
| Ex. 5-33 | 10 | 80 | 10 | 1 | 6.0 | 1.08 | 0.46 | −1554 | −4.1 |
| Ex. 5-34 | 0 | 80 | 20 | 1 | 1.6 | 1.09 | 0.39 | −1730 | −10.1 |

Ex. 5-35 to 5-140

In Ex. 5-35 to 5-140, a working fluid comprising, in addition to HFO-1123 and CF$_3$I, HFO-123yf and HFO-1132 (E) in a proportion as identified in Table 14, 15 or 16 was prepared. By the above method, the temperature glide, the discharge temperature difference and the refrigerating cycle performance (relative refrigerating capacity and relative coefficient of performance) were measured and calculated, and the results are shown in Tables 14 to 16.

TABLE 14

| | Working fluid composition [mass %] | | | | | Evaluation | | | (Relative to R410A) | |
|---|---|---|---|---|---|---|---|---|---|---|
| | | | | | | | | | Discharge pressure | Discharge temperature |
| | HFO-1123 | CF$_3$I | HFO-1234yf | HFO-1132(E) | GWP | Temperature glide [° C.] | Relative COP | Relative capacity | difference [kPa] | difference [° C.] |
| Ex. 5-35 | 80 | 10 | 10 | 0 | 1 | 4.8 | 0.97 | 0.98 | 133 | −6.3 |
| Ex. 5-36 | 70 | 10 | 10 | 10 | 1 | 4.8 | 0.97 | 0.98 | 106 | −4.6 |
| Ex. 5-37 | 60 | 10 | 10 | 20 | 1 | 4.8 | 0.97 | 0.97 | 49 | −2.8 |
| Ex. 5-38 | 50 | 10 | 10 | 30 | 1 | 4.7 | 0.98 | 0.95 | −29 | −1.0 |
| Ex. 5-39 | 40 | 10 | 10 | 40 | 1 | 4.6 | 0.99 | 0.94 | −120 | 0.8 |
| Ex. 5-40 | 30 | 10 | 10 | 50 | 1 | 4.2 | 1.00 | 0.91 | −221 | 2.6 |
| Ex. 5-41 | 20 | 10 | 10 | 60 | 1 | 3.5 | 1.00 | 0.89 | −326 | 4.2 |
| Ex. 5-42 | 10 | 10 | 10 | 70 | 1 | 2.5 | 1.01 | 0.86 | −434 | 5.6 |
| Ex. 5-43 | 70 | 20 | 10 | 0 | 1 | 6.8 | 0.99 | 0.92 | −110 | −4.9 |
| Ex. 5-44 | 60 | 20 | 10 | 10 | 1 | 6.9 | 0.99 | 0.92 | −139 | −2.9 |
| Ex. 5-45 | 50 | 20 | 10 | 20 | 1 | 6.9 | 0.99 | 0.91 | −194 | −1.0 |
| Ex. 5-46 | 40 | 20 | 10 | 30 | 1 | 6.7 | 1.00 | 0.89 | −266 | 0.8 |
| Ex. 5-47 | 30 | 20 | 10 | 40 | 1 | 6.2 | 1.00 | 0.87 | −350 | 2.6 |
| Ex. 5-48 | 20 | 20 | 10 | 50 | 1 | 5.3 | 1.01 | 0.85 | −441 | 4.1 |
| Ex. 5-49 | 10 | 20 | 10 | 60 | 1 | 4.0 | 1.02 | 0.83 | −536 | 5.5 |
| Ex. 5-50 | 60 | 30 | 10 | 0 | 1 | 8.6 | 1.01 | 0.86 | −348 | −3.7 |
| Ex. 5-51 | 50 | 30 | 10 | 10 | 1 | 8.8 | 1.01 | 0.85 | −376 | −1.6 |
| Ex. 5-52 | 40 | 30 | 10 | 20 | 1 | 8.6 | 1.01 | 0.84 | −427 | 0.4 |
| Ex. 5-53 | 30 | 30 | 10 | 30 | 1 | 8.0 | 1.02 | 0.83 | −492 | 2.2 |
| Ex. 5-54 | 20 | 30 | 10 | 40 | 1 | 7.0 | 1.02 | 0.81 | −567 | 3.8 |
| Ex. 5-55 | 10 | 30 | 10 | 50 | 1 | 5.5 | 1.03 | 0.79 | −648 | 5.1 |
| Ex. 5-56 | 50 | 40 | 10 | 0 | 1 | 9.8 | 1.02 | 0.79 | −588 | −2.8 |
| Ex. 5-57 | 40 | 40 | 10 | 10 | 1 | 10.0 | 1.03 | 0.79 | −610 | −0.6 |
| Ex. 5-58 | 30 | 40 | 10 | 20 | 1 | 9.5 | 1.03 | 0.78 | −652 | 1.4 |
| Ex. 5-59 | 20 | 40 | 10 | 30 | 1 | 8.5 | 1.03 | 0.77 | −706 | 3.0 |
| Ex. 5-60 | 10 | 40 | 10 | 40 | 1 | 6.9 | 1.04 | 0.75 | −770 | 4.4 |
| Ex. 5-61 | 40 | 50 | 10 | 0 | 1 | 10.4 | 1.04 | 0.71 | −827 | −2.2 |
| Ex. 5-62 | 30 | 50 | 10 | 10 | 1 | 10.5 | 1.05 | 0.72 | −837 | 0.0 |
| Ex. 5-63 | 20 | 50 | 10 | 20 | 1 | 9.7 | 1.05 | 0.71 | −865 | 1.9 |
| Ex. 5-64 | 10 | 50 | 10 | 30 | 1 | 8.2 | 1.05 | 0.70 | −906 | 3.3 |
| Ex. 5-65 | 30 | 60 | 10 | 0 | 1 | 10.2 | 1.06 | 0.64 | −1067 | −2.1 |

TABLE 14-continued

|  | Working fluid composition [mass %] | | | | | Temperature | Evaluation (Relative to R410A) | | | |
|---|---|---|---|---|---|---|---|---|---|---|
|  | HFO-1123 | CF$_3$I | HFO-1234yf | HFO-1132(E) | GWP | glide [° C.] | Relative COP | Relative capacity | Discharge pressure difference [kPa] | Discharge temperature difference [° C.] |
| Ex. 5-66 | 20 | 60 | 10 | 10 | 1 | 10.2 | 1.06 | 0.65 | −1053 | 0.1 |
| Ex. 5-67 | 10 | 60 | 10 | 20 | 1 | 9.2 | 1.06 | 0.65 | −1059 | 1.7 |
| Ex. 5-68 | 70 | 10 | 20 | 0 | 1 | 6.0 | 0.99 | 0.91 | −119 | −6.7 |
| Ex. 5-69 | 60 | 10 | 20 | 10 | 1 | 5.9 | 0.99 | 0.91 | −135 | −5.1 |
| Ex. 5-70 | 50 | 10 | 20 | 20 | 1 | 5.7 | 0.99 | 0.91 | −177 | −3.5 |
| Ex. 5-71 | 40 | 10 | 20 | 30 | 1 | 5.3 | 1.00 | 0.89 | −238 | −2.0 |
| Ex. 5-72 | 30 | 10 | 20 | 40 | 1 | 4.7 | 1.00 | 0.88 | −313 | −0.5 |
| Ex. 5-73 | 20 | 10 | 20 | 50 | 1 | 3.9 | 1.01 | 0.86 | −396 | 0.8 |
| Ex. 5-74 | 10 | 10 | 20 | 60 | 1 | 2.8 | 1.01 | 0.84 | −484 | 2.1 |

TABLE 15

|  | Working fluid composition [mass %] | | | | | Temperature | Evaluation (Relative to R410A) | | | |
|---|---|---|---|---|---|---|---|---|---|---|
|  | HFO-1123 | CF$_3$I | HFO-1234yf | HFO-1132(E) | GWP | glide [° C.] | Relative COP | Relative capacity | Discharge pressure difference [kPa] | Discharge temperature difference [° C.] |
| Ex. 5-75 | 60 | 20 | 20 | 0 | 1 | 7.4 | 1.00 | 0.85 | −344 | −5.9 |
| Ex. 5-76 | 50 | 20 | 20 | 10 | 1 | 7.4 | 1.00 | 0.85 | −360 | −4.1 |
| Ex. 5-77 | 40 | 20 | 20 | 20 | 1 | 7.1 | 1.01 | 0.85 | −399 | −2.5 |
| Ex. 5-78 | 30 | 20 | 20 | 30 | 1 | 6.5 | 1.01 | 0.83 | −454 | −0.9 |
| Ex. 5-79 | 20 | 20 | 20 | 40 | 1 | 5.6 | 1.02 | 0.82 | −521 | 0.5 |
| Ex. 5-80 | 10 | 20 | 20 | 50 | 1 | 4.2 | 1.02 | 0.80 | −596 | 1.7 |
| Ex. 5-81 | 50 | 30 | 20 | 0 | 1 | 8.4 | 1.02 | 0.79 | −573 | −5.3 |
| Ex. 5-82 | 40 | 30 | 20 | 10 | 1 | 8.4 | 1.02 | 0.79 | −583 | −3.4 |
| Ex. 5-83 | 30 | 30 | 20 | 20 | 1 | 8.0 | 1.03 | 0.78 | −615 | −1.7 |
| Ex. 5-84 | 20 | 30 | 20 | 30 | 1 | 7.1 | 1.03 | 0.77 | −661 | −0.3 |
| Ex. 5-85 | 10 | 30 | 20 | 40 | 1 | 5.7 | 1.03 | 0.76 | −718 | 0.9 |
| Ex. 5-86 | 40 | 40 | 20 | 0 | 1 | 8.8 | 1.04 | 0.72 | −801 | −5.0 |
| Ex. 5-87 | 30 | 40 | 20 | 10 | 1 | 8.8 | 1.04 | 0.72 | −801 | −3.0 |
| Ex. 5-88 | 20 | 40 | 20 | 20 | 1 | 8.2 | 1.04 | 0.72 | −820 | −1.4 |
| Ex. 5-89 | 10 | 40 | 20 | 30 | 1 | 6.9 | 1.04 | 0.71 | −854 | −0.1 |
| Ex. 5-90 | 30 | 50 | 20 | 0 | 1 | 8.6 | 1.05 | 0.64 | −1031 | −5.1 |
| Ex. 5-91 | 20 | 50 | 20 | 10 | 1 | 8.7 | 1.06 | 0.66 | −1009 | −3.2 |
| Ex. 5-92 | 10 | 50 | 20 | 20 | 1 | 7.9 | 1.06 | 0.66 | −1007 | −1.7 |
| Ex. 5-93 | 20 | 60 | 20 | 0 | 1 | 7.4 | 1.07 | 0.56 | −1262 | −5.8 |
| Ex. 5-94 | 10 | 60 | 20 | 10 | 1 | 8.3 | 1.08 | 0.60 | −1180 | −4.0 |
| Ex. 5-95 | 60 | 10 | 30 | 0 | 1 | 6.8 | 1.00 | 0.84 | −356 | −7.4 |
| Ex. 5-96 | 50 | 10 | 30 | 10 | 1 | 6.6 | 1.00 | 0.85 | −359 | −5.9 |
| Ex. 5-97 | 40 | 10 | 30 | 20 | 1 | 6.2 | 1.01 | 0.84 | −387 | −4.5 |
| Ex. 5-98 | 30 | 10 | 30 | 30 | 1 | 5.5 | 1.01 | 0.84 | −432 | −3.3 |
| Ex. 5-99 | 20 | 10 | 30 | 40 | 1 | 4.6 | 1.01 | 0.82 | −490 | −2.1 |
| Ex. 5-100 | 10 | 10 | 30 | 50 | 1 | 3.4 | 1.02 | 0.81 | −557 | −1.1 |
| Ex. 5-101 | 50 | 20 | 30 | 0 | 1 | 7.4 | 1.02 | 0.78 | −570 | −7.1 |
| Ex. 5-102 | 40 | 20 | 30 | 10 | 1 | 7.3 | 1.02 | 0.79 | −570 | −5.5 |
| Ex. 5-103 | 30 | 20 | 30 | 20 | 1 | 6.8 | 1.02 | 0.79 | −592 | −4.1 |
| Ex. 5-104 | 20 | 20 | 30 | 30 | 1 | 6.0 | 1.03 | 0.78 | −630 | −2.8 |
| Ex. 5-105 | 10 | 20 | 30 | 40 | 1 | 4.8 | 1.03 | 0.77 | −680 | −1.8 |
| Ex. 5-106 | 40 | 30 | 30 | 0 | 1 | 7.6 | 1.04 | 0.72 | −788 | −7.1 |
| Ex. 5-107 | 30 | 30 | 30 | 10 | 1 | 7.6 | 1.04 | 0.73 | −778 | −5.4 |
| Ex. 5-108 | 20 | 30 | 30 | 20 | 1 | 7.0 | 1.04 | 0.73 | −789 | −4.0 |
| Ex. 5-109 | 10 | 30 | 30 | 30 | 1 | 6.0 | 1.04 | 0.72 | −816 | −2.9 |
| Ex. 5-110 | 30 | 40 | 30 | 0 | 1 | 7.2 | 1.05 | 0.65 | −1007 | −7.5 |
| Ex. 5-111 | 20 | 40 | 30 | 10 | 1 | 7.4 | 1.05 | 0.66 | −977 | −5.8 |
| Ex. 5-112 | 10 | 40 | 30 | 20 | 1 | 6.9 | 1.05 | 0.67 | −969 | −4.5 |
| Ex. 5-113 | 20 | 50 | 30 | 0 | 1 | 6.2 | 1.06 | 0.57 | −1228 | −8.3 |
| Ex. 5-114 | 10 | 50 | 30 | 10 | 1 | 7.1 | 1.07 | 0.61 | −1142 | −6.7 |

TABLE 16

| | Working fluid composition [mass %] | | | | | Temperature glide [° C.] | Evaluation (Relative to R410A) | | | |
|---|---|---|---|---|---|---|---|---|---|---|
| | HFO-1123 | CF$_3$I | HFO-1234yf | HFO-1132(E) | GWP | | Relative COP | Relative capacity | Discharge pressure difference [kPa] | Discharge temperature difference [° C.] |
| Ex. 5-115 | 10 | 60 | 30 | 0 | 1 | 4.2 | 1.07 | 0.49 | −1450 | −9.9 |
| Ex. 5-116 | 50 | 10 | 40 | 0 | 1 | 7.2 | 1.02 | 0.78 | −581 | −8.4 |
| Ex. 5-117 | 40 | 10 | 40 | 10 | 1 | 7.0 | 1.02 | 0.78 | −570 | −7.0 |
| Ex. 5-118 | 30 | 10 | 40 | 20 | 1 | 6.4 | 1.02 | 0.78 | −583 | −5.8 |
| Ex. 5-119 | 20 | 10 | 40 | 30 | 1 | 5.5 | 1.02 | 0.78 | −612 | −4.7 |
| Ex. 5-120 | 10 | 10 | 40 | 40 | 1 | 4.3 | 1.02 | 0.77 | −654 | −3.9 |
| Ex. 5-121 | 40 | 20 | 40 | 0 | 1 | 7.0 | 1.03 | 0.71 | −786 | −8.6 |
| Ex. 5-122 | 30 | 20 | 40 | 10 | 1 | 7.0 | 1.03 | 0.72 | −767 | −7.1 |
| Ex. 5-123 | 20 | 20 | 40 | 20 | 1 | 6.4 | 1.04 | 0.73 | −771 | −5.9 |
| Ex. 5-124 | 10 | 20 | 40 | 30 | 1 | 5.4 | 1.04 | 0.72 | −790 | −5.0 |
| Ex. 5-125 | 30 | 30 | 40 | 0 | 1 | 6.6 | 1.05 | 0.65 | −995 | −9.2 |
| Ex. 5-126 | 20 | 30 | 40 | 10 | 1 | 6.7 | 1.05 | 0.66 | −958 | −7.7 |
| Ex. 5-127 | 10 | 30 | 40 | 20 | 1 | 6.2 | 1.05 | 0.67 | −944 | −6.5 |
| Ex. 5-128 | 20 | 40 | 40 | 0 | 1 | 5.4 | 1.06 | 0.58 | −1205 | −10.3 |
| Ex. 5-129 | 10 | 40 | 40 | 10 | 1 | 6.4 | 1.07 | 0.61 | −1118 | −8.8 |
| Ex. 5-130 | 10 | 50 | 40 | 0 | 1 | 3.4 | 1.07 | 0.50 | −1418 | −12.0 |
| Ex. 5-131 | 40 | 10 | 50 | 0 | 1 | 7.0 | 1.03 | 0.71 | −794 | −9.7 |
| Ex. 5-132 | 30 | 10 | 50 | 10 | 1 | 6.9 | 1.03 | 0.72 | −768 | −8.4 |
| Ex. 5-133 | 20 | 10 | 50 | 20 | 1 | 6.3 | 1.03 | 0.73 | −764 | −7.3 |
| Ex. 5-134 | 10 | 10 | 50 | 30 | 1 | 5.3 | 1.03 | 0.72 | −776 | −6.5 |
| Ex. 5-135 | 30 | 20 | 50 | 0 | 1 | 6.2 | 1.05 | 0.64 | −992 | −10.5 |
| Ex. 5-136 | 20 | 20 | 50 | 10 | 1 | 6.4 | 1.05 | 0.66 | −950 | −9.1 |
| Ex. 5-137 | 10 | 20 | 50 | 20 | 1 | 6.0 | 1.05 | 0.68 | −929 | −8.1 |
| Ex. 5-138 | 20 | 30 | 50 | 0 | 1 | 5.0 | 1.06 | 0.58 | −1194 | −11.7 |
| Ex. 5-139 | 10 | 30 | 50 | 10 | 1 | 5.9 | 1.06 | 0.62 | −1103 | −10.4 |
| Ex. 5-140 | 10 | 40 | 50 | 0 | 1 | 3.0 | 1.07 | 0.51 | −1397 | −13.5 |

Ex. 6-1 to 6-25

In Ex. 6-1 to 6-25, a working fluid comprising, in addition to HFO-1123 and CF$_3$I, HFO-1234ze in a proportion as identified in Table 17 was prepared. By the above method, the temperature glide, the discharge temperature difference and the refrigerating cycle performance (relative refrigerating capacity and relative coefficient of performance) were measured and calculated, and the results are shown in Table 17.

TABLE 17

| | Working fluid composition [mass %] | | | | Temperature glide [° C.] | Evaluation (Relative to R410A) | | | |
|---|---|---|---|---|---|---|---|---|---|
| | HFO-1123 | CF$_3$I | HFO-1234ze(E) | GWP | | Relative COP | Relative capacity | Discharge pressure difference [kPa] | Discharge temperature difference [° C.] |
| Ex. 6-1 | 60 | 30 | 10 | 1 | 9.0 | 1.01 | 0.85 | −378 | −3.1 |
| Ex. 6-2 | 50 | 30 | 20 | 1 | 9.4 | 1.03 | 0.77 | −631 | −4.0 |
| Ex. 6-3 | 40 | 30 | 30 | 1 | 9.2 | 1.04 | 0.69 | −874 | −5.1 |
| Ex. 6-4 | 30 | 30 | 40 | 1 | 8.6 | 1.06 | 0.62 | −1107 | −6.5 |
| Ex. 6-5 | 20 | 30 | 50 | 1 | 7.2 | 1.07 | 0.54 | −1331 | −8.5 |
| Ex. 6-6 | 10 | 30 | 60 | 1 | 4.8 | 1.08 | 0.46 | −1547 | −11.3 |
| Ex. 6-7 | 0 | 30 | 70 | 1 | 1.0 | 1.09 | 0.38 | −1759 | −15.3 |
| Ex. 6-8 | 50 | 40 | 10 | 1 | 10.0 | 1.03 | 0.78 | −613 | −2.3 |
| Ex. 6-9 | 40 | 40 | 20 | 1 | 9.4 | 1.04 | 0.70 | −852 | −3.9 |
| Ex. 6-10 | 30 | 40 | 30 | 1 | 8.2 | 1.06 | 0.63 | −1083 | −5.8 |
| Ex. 6-11 | 20 | 40 | 40 | 1 | 6.6 | 1.07 | 0.55 | −1307 | −8.0 |
| Ex. 6-12 | 10 | 40 | 50 | 1 | 4.2 | 1.08 | 0.47 | −1524 | −10.9 |
| Ex. 6-13 | 0 | 40 | 60 | 1 | 0.8 | 1.08 | 0.39 | −1735 | −14.8 |
| Ex. 6-14 | 40 | 50 | 10 | 1 | 10.4 | 1.05 | 0.71 | −849 | −1.8 |
| Ex. 6-15 | 30 | 50 | 20 | 1 | 8.6 | 1.06 | 0.63 | −1075 | −4.2 |
| Ex. 6-16 | 20 | 50 | 30 | 1 | 6.4 | 1.07 | 0.55 | −1296 | −7.0 |

TABLE 17-continued

|  | Working fluid composition [mass %] | | | | Temperature glide [° C.] | Evaluation | | | |
|---|---|---|---|---|---|---|---|---|---|
|  |  |  |  |  |  | (Relative to R410A) | | | |
|  | HFO-1123 | CF$_3$I | HFO-1234ze(E) | GWP |  | Relative COP | Relative capacity | Discharge pressure difference [kPa] | Discharge temperature difference [° C.] |
| Ex. 6-17 | 10 | 50 | 40 | 1 | 3.8 | 1.08 | 0.47 | −1510 | −10.2 |
| Ex. 6-18 | 0 | 50 | 50 | 1 | 0.4 | 1.08 | 0.39 | −1719 | −14.2 |
| Ex. 6-19 | 30 | 60 | 10 | 1 | 10.0 | 1.06 | 0.63 | −1086 | −1.7 |
| Ex. 6-20 | 20 | 60 | 20 | 1 | 7.2 | 1.07 | 0.55 | −1301 | −5.1 |
| Ex. 6-21 | 10 | 60 | 30 | 1 | 3.8 | 1.08 | 0.47 | −1511 | −8.9 |
| Ex. 6-22 | 0 | 60 | 40 | 1 | 0.0 | 1.08 | 0.40 | −1715 | −13.3 |
| Ex. 6-23 | 20 | 70 | 10 | 1 | 8.6 | 1.07 | 0.55 | −1325 | −2.3 |
| Ex. 6-24 | 10 | 70 | 20 | 1 | 4.6 | 1.08 | 0.47 | −1529 | −6.8 |
| Ex. 6-25 | 0 | 70 | 30 | 1 | 0.2 | 1.09 | 0.39 | −1727 | −11.8 |

Ex. 7-1 to 7-49

In Ex. 7-1 to 7-49, a working fluid comprising, in addition to HFO-1123 and CF$_3$I, propane in a proportion as identified in Table 18 was prepared. By the above method, the temperature glide, the discharge temperature difference and the refrigerating cycle performance (relative refrigerating capacity and relative coefficient of performance) were measured and calculated, and the results are shown in Table 18.

TABLE 18

|  | Working fluid composition [mass %] | | | | Temperature glide [° C.] | Evaluation | | | |
|---|---|---|---|---|---|---|---|---|---|
|  |  |  |  |  |  | (Relative to R410A) | | | |
|  | HFO-1123 | CF$_3$I | Propane | GWP |  | Relative COP | Relative capacity | Discharge pressure difference [kPa] | Discharge temperature difference [° C.] |
| Ex. 7-1 | 60 | 38 | 2 | 1 | 9.8 | 1.01 | 0.85 | −387 | −1.5 |
| Ex. 7-2 | 50 | 48 | 2 | 1 | 11.0 | 1.03 | 0.78 | −626 | −0.4 |
| Ex. 7-3 | 40 | 58 | 2 | 1 | 11.6 | 1.05 | 0.71 | −864 | 0.3 |
| Ex. 7-4 | 30 | 68 | 2 | 1 | 11.3 | 1.06 | 0.63 | −1102 | 0.7 |
| Ex. 7-5 | 20 | 78 | 2 | 1 | 9.8 | 1.08 | 0.55 | −1342 | 0.4 |
| Ex. 7-6 | 10 | 88 | 2 | 1 | 6.7 | 1.09 | 0.45 | −1588 | −1.0 |
| Ex. 7-7 | 0 | 98 | 2 | 1 | 1.3 | 1.10 | 0.36 | −1840 | −4.1 |
| Ex. 7-8 | 60 | 35 | 5 | 1 | 8.7 | 1.01 | 0.84 | −416 | −2.6 |
| Ex. 7-9 | 50 | 45 | 5 | 1 | 9.8 | 1.03 | 0.78 | −639 | −1.6 |
| Ex. 7-10 | 40 | 55 | 5 | 1 | 10.3 | 1.05 | 0.71 | −861 | −1.0 |
| Ex. 7-11 | 30 | 65 | 5 | 1 | 10.1 | 1.06 | 0.63 | −1084 | −0.7 |
| Ex. 7-12 | 20 | 75 | 5 | 1 | 8.9 | 1.07 | 0.56 | −1309 | −1.0 |
| Ex. 7-13 | 10 | 85 | 5 | 1 | 6.5 | 1.08 | 0.47 | −1536 | −2.1 |
| Ex. 7-14 | 0 | 95 | 5 | 1 | 2.5 | 1.09 | 0.39 | −1766 | −4.4 |
| Ex. 7-15 | 60 | 30 | 10 | 1 | 7.3 | 1.02 | 0.83 | −459 | −4.0 |
| Ex. 7-16 | 50 | 40 | 10 | 1 | 8.1 | 1.03 | 0.77 | −659 | −3.3 |
| Ex. 7-17 | 40 | 50 | 10 | 1 | 8.6 | 1.04 | 0.70 | −860 | −2.8 |
| Ex. 7-18 | 30 | 60 | 10 | 1 | 8.4 | 1.06 | 0.64 | −1061 | −2.6 |
| Ex. 7-19 | 20 | 70 | 10 | 1 | 7.6 | 1.07 | 0.57 | −1262 | −2.9 |
| Ex. 7-20 | 10 | 80 | 10 | 1 | 5.9 | 1.08 | 0.50 | −1465 | −3.7 |
| Ex. 7-21 | 0 | 90 | 10 | 1 | 3.3 | 1.09 | 0.42 | −1668 | −5.3 |
| Ex. 7-22 | 60 | 25 | 15 | 1 | 6.2 | 1.02 | 0.82 | −497 | 5.2 |
| Ex. 7-23 | 50 | 35 | 15 | 1 | 6.9 | 1.03 | 0.76 | −679 | −4.6 |
| Ex. 7-24 | 40 | 45 | 15 | 1 | 7.2 | 1.04 | 0.70 | −861 | −4.2 |
| Ex. 7-25 | 30 | 55 | 15 | 1 | 7.1 | 1.06 | 0.64 | −1043 | −4.1 |
| Ex. 7-26 | 20 | 65 | 15 | 1 | 6.5 | 1.07 | 0.58 | −1226 | −4.4 |
| Ex. 7-27 | 10 | 75 | 15 | 1 | 5.2 | 1.07 | 0.52 | −1409 | −5.0 |
| Ex. 7-28 | 0 | 85 | 15 | 1 | 3.3 | 1.08 | 0.45 | −1592 | −6.2 |
| Ex. 7-29 | 60 | 20 | 20 | 1 | 5.3 | 1.02 | 0.80 | −530 | −6.1 |
| Ex. 7-30 | 50 | 30 | 20 | 1 | 5.9 | 1.03 | 0.75 | −697 | −5.7 |
| Ex. 7-31 | 40 | 40 | 20 | 1 | 6.1 | 1.04 | 0.70 | −863 | −5.4 |
| Ex. 7-32 | 30 | 50 | 20 | 1 | 6.0 | 1.05 | 0.65 | −1030 | −5.3 |
| Ex. 7-33 | 20 | 60 | 20 | 1 | 5.5 | 1.06 | 0.59 | −1197 | −5.6 |
| Ex. 7-34 | 10 | 70 | 20 | 1 | 4.5 | 1.07 | 0.53 | −1364 | −6.1 |

TABLE 18-continued

|  | Working fluid composition [mass %] | | | GWP | Temperature glide [° C.] | Evaluation (Relative to R410A) | | Discharge pressure difference [kPa] | Discharge temperature difference [° C.] |
|---|---|---|---|---|---|---|---|---|---|
|  | HFO-1123 | CF$_3$I | Propane |  |  | Relative COP | Relative capacity |  |  |
| Ex. 7-35 | 0 | 80 | 20 | 1 | 3.1 | 1.08 | 0.47 | −1530 | −7.1 |
| Ex. 7-36 | 60 | 15 | 25 | 1 | 4.7 | 1.03 | 0.80 | −560 | 6.9 |
| Ex. 7-37 | 50 | 25 | 25 | 1 | 5.1 | 1.04 | 0.75 | −713 | −6.5 |
| Ex. 7-38 | 40 | 35 | 25 | 1 | 5.2 | 1.05 | 0.70 | −866 | −6.3 |
| Ex. 7-39 | 30 | 45 | 25 | 1 | 5.1 | 1.05 | 0.65 | −1020 | −6.3 |
| Ex. 7-40 | 20 | 55 | 25 | 1 | 4.7 | 1.06 | 0.60 | −1174 | −6.6 |
| Ex. 7-41 | 10 | 65 | 25 | 1 | 3.9 | 1.07 | 0.54 | −1327 | −7.1 |
| Ex. 7-42 | 0 | 75 | 25 | 1 | 2.8 | 1.08 | 0.49 | −1480 | −7.9 |
| Ex. 7-43 | 60 | 10 | 30 | 1 | 4.1 | 1.03 | 0.79 | −586 | −7.5 |
| Ex. 7-44 | 50 | 20 | 30 | 1 | 4.4 | 1.04 | 0.74 | −728 | −7.2 |
| Ex. 7-45 | 40 | 30 | 30 | 1 | 4.5 | 1.05 | 0.70 | −870 | −7.1 |
| Ex. 7-46 | 30 | 40 | 30 | 1 | 4.4 | 1.05 | 0.65 | −1012 | −7.1 |
| Ex. 7-47 | 20 | 50 | 30 | 1 | 4.0 | 1.06 | 0.60 | −1155 | −7.4 |
| Ex. 7-48 | 10 | 60 | 30 | 1 | 3.4 | 1.07 | 0.55 | −1297 | −7.8 |
| Ex. 7-49 | 0 | 70 | 30 | 1 | 2.4 | 1.08 | 0.50 | −1438 | −8.5 |

Ex. 8-1 to 8-49

In Ex. 8-1 to 8-49, a working fluid comprising, in addition to HFO-1123 and CF$_3$I, HFC-161 in a proportion as identified in Table 19 was prepared. By the above method, the temperature glide, the discharge temperature difference and the refrigerating cycle performance (relative refrigerating capacity and relative coefficient of performance) were measured and calculated, and the results are shown in Table 19.

TABLE 19

|  | Working fluid composition [mass %] | | | GWP | Temperature glide [° C.] | Evaluation (Relative to R410A) | | Discharge pressure difference [kPa] | Discharge temperature difference [° C.] |
|---|---|---|---|---|---|---|---|---|---|
|  | HFO-1123 | CF$_3$I | HFC-161 |  |  | Relative COP | Relative capacity |  |  |
| Ex. 8-1 | 60 | 38 | 2 | 1 | 9.6 | 1.01 | 0.86 | −359 | −1.2 |
| Ex. 8-2 | 50 | 48 | 2 | 1 | 11.0 | 1.03 | 0.79 | −601 | 0.0 |
| Ex. 8-3 | 40 | 58 | 2 | 1 | 11.6 | 1.04 | 0.72 | −840 | 0.9 |
| Ex. 8-4 | 30 | 68 | 2 | 1 | 11.4 | 1.06 | 0.64 | −1080 | 1.3 |
| Ex. 8-5 | 20 | 78 | 2 | 1 | 10.1 | 1.07 | 0.55 | −1322 | 1.2 |
| Ex. 8-6 | 10 | 88 | 2 | 1 | 7.2 | 1.09 | 0.46 | −1567 | 0.2 |
| Ex. 8-7 | 0 | 98 | 2 | 1 | 2.3 | 1.10 | 0.37 | −1817 | −2.4 |
| Ex. 8-8 | 60 | 35 | 5 | 1 | 8.4 | 1.01 | 0.86 | −353 | −1.7 |
| Ex. 8-9 | 50 | 45 | 5 | 1 | 9.6 | 1.02 | 0.80 | −581 | −0.6 |
| Ex. 8-10 | 40 | 55 | 5 | 1 | 10.2 | 1.04 | 0.73 | −808 | 0.3 |
| Ex. 8-11 | 30 | 65 | 5 | 1 | 10.2 | 1.06 | 0.65 | −1034 | 0.8 |
| Ex. 8-12 | 20 | 75 | 5 | 1 | 9.4 | 1.07 | 0.57 | −1262 | 0.9 |
| Ex. 8-13 | 10 | 85 | 5 | 1 | 7.4 | 1.08 | 0.49 | −1490 | 0.4 |
| Ex. 8-14 | 0 | 95 | 5 | 1 | 4.0 | 1.09 | 0.41 | −1718 | −1.1 |
| Ex. 8-15 | 60 | 30 | 10 | 1 | 6.8 | 1.01 | 0.86 | −354 | −2.4 |
| Ex. 8-16 | 50 | 40 | 10 | 1 | 7.7 | 1.02 | 0.80 | −561 | −1.4 |
| Ex. 8-17 | 40 | 50 | 10 | 1 | 8.3 | 1.04 | 0.74 | −768 | −0.6 |
| Ex. 8-18 | 30 | 60 | 10 | 1 | 8.3 | 1.05 | 0.67 | −976 | 0.0 |
| Ex. 8-19 | 20 | 70 | 10 | 1 | 7.8 | 1.06 | 0.60 | −1183 | 0.3 |
| Ex. 8-20 | 10 | 80 | 10 | 1 | 6.6 | 1.07 | 0.53 | −1390 | 0.1 |
| Ex. 8-21 | 0 | 90 | 10 | 1 | 4.6 | 1.08 | 0.45 | −1595 | −0.5 |
| Ex. 8-22 | 60 | 25 | 15 | 1 | 5.7 | 1.01 | 0.86 | −364 | −2.7 |
| Ex. 8-23 | 50 | 35 | 15 | 1 | 6.4 | 1.03 | 0.81 | −554 | −1.9 |
| Ex. 8-24 | 40 | 45 | 15 | 1 | 6.8 | 1.04 | 0.75 | −744 | −1.2 |
| Ex. 8-25 | 30 | 55 | 15 | 1 | 6.8 | 1.05 | 0.69 | −934 | −0.7 |
| Ex. 8-26 | 20 | 65 | 15 | 1 | 6.4 | 1.06 | 0.62 | −1125 | −0.3 |
| Ex. 8-27 | 10 | 75 | 15 | 1 | 5.4 | 1.07 | 0.55 | −1315 | −0.3 |
| Ex. 8-28 | 0 | 85 | 15 | 1 | 4.0 | 1.08 | 0.49 | −1503 | −0.6 |

TABLE 19-continued

|  | Working fluid composition [mass %] | | | | Evaluation | | | | |
|---|---|---|---|---|---|---|---|---|---|
|  | | | | | | | (Relative to R410A) | | |
|  | | | | | Temperature | | | Discharge pressure | Discharge temperature |
|  | HFO-1123 | $CF_3I$ | HFC-161 | GWP | glide [° C.] | Relative COP | Relative capacity | difference [kPa] | difference [° C.] |
| Ex. 8-29 | 60 | 20 | 20 | 1 | 5.0 | 1.02 | 0.86 | −382 | −2.8 |
| Ex. 8-30 | 50 | 30 | 20 | 1 | 5.5 | 1.03 | 0.81 | −556 | −2.1 |
| Ex. 8-31 | 40 | 40 | 20 | 1 | 5.7 | 1.04 | 0.75 | −731 | −1.6 |
| Ex. 8-32 | 30 | 50 | 20 | 1 | 5.6 | 1.05 | 0.70 | −906 | −1.1 |
| Ex. 8-33 | 20 | 60 | 20 | 1 | 5.1 | 1.06 | 0.64 | −1082 | −0.8 |
| Ex. 8-34 | 10 | 70 | 20 | 1 | 4.3 | 1.06 | 0.57 | −1258 | −0.7 |
| Ex. 8-35 | 0 | 80 | 20 | 1 | 3.1 | 1.08 | 0.51 | −1432 | −1.0 |
| Ex. 8-36 | 60 | 15 | 25 | 1 | 4.6 | 1.02 | 0.86 | −403 | −2.7 |
| Ex. 8-37 | 50 | 25 | 25 | 1 | 4.9 | 1.03 | 0.81 | −564 | −2.2 |
| Ex. 8-38 | 40 | 35 | 25 | 1 | 4.9 | 1.04 | 0.76 | −726 | −1.7 |
| Ex. 8-39 | 30 | 45 | 25 | 1 | 4.7 | 1.05 | 0.70 | −889 | −1.4 |
| Ex. 8-40 | 20 | 55 | 25 | 1 | 4.2 | 1.06 | 0.65 | −1052 | −1.1 |
| Ex. 8-41 | 10 | 65 | 25 | 1 | 3.4 | 1.06 | 0.59 | −1215 | −1.1 |
| Ex. 8-42 | 0 | 75 | 25 | 1 | 2.3 | 1.07 | 0.53 | −1377 | −1.2 |
| Ex. 8-43 | 60 | 10 | 30 | 1 | 4.4 | 1.02 | 0.85 | −427 | −2.5 |
| Ex. 8-44 | 50 | 20 | 30 | 1 | 4.5 | 1.03 | 0.81 | −577 | −2.1 |
| Ex. 8-45 | 40 | 30 | 30 | 1 | 4.4 | 1.04 | 0.76 | −727 | −1.7 |
| Ex. 8-46 | 30 | 40 | 30 | 1 | 4.1 | 1.05 | 0.71 | −879 | −1.4 |
| Ex. 8-47 | 20 | 50 | 30 | 1 | 3.5 | 1.06 | 0.66 | −1031 | −1.3 |
| Ex. 8-48 | 10 | 60 | 30 | 1 | 2.7 | 1.06 | 0.60 | −1183 | −1.2 |
| Ex. 8-49 | 0 | 70 | 30 | 1 | 1.6 | 1.07 | 0.55 | −1335 | −1.4 |

Ex. 9-1 to 9-18

In Ex. 9-1 to 9-18, a working fluid comprising, in addition to HFO-1123 and $CF_3I$, HFC-125 and HFC-32 in a proportion as identified in Table 20 was prepared. By the above method, the temperature glide, the discharge temperature difference and the refrigerating cycle performance (relative refrigerating capacity and relative coefficient of performance) were measured and calculated, and the results are shown in Table 20.

TABLE 20

|  | Working fluid composition [mass %] | | | | | Evaluation | | | | |
|---|---|---|---|---|---|---|---|---|---|---|
|  | | | | | | | | (Relative to R410A) | | |
|  | | | | | | Temperature | | | Discharge pressure | Discharge temperature |
|  | HFO-1123 | $CF_3I$ | HFC-125 | HFC-32 | GWP | glide [° C.] | Relative COP | Relative capacity | difference [kPa] | difference [° C.] |
| Ex. 9-1 | 30 | 50 | 10 | 10 | 386 | 10.4 | 1.00 | 0.84 | −411 | 1.7 |
| Ex. 9-2 | 20 | 50 | 10 | 20 | 453 | 7.6 | 0.98 | 0.90 | −219 | 3.4 |
| Ex. 9-3 | 40 | 40 | 10 | 10 | 386 | 8.2 | 0.99 | 0.90 | −208 | −0.1 |
| Ex. 9-4 | 30 | 40 | 10 | 20 | 453 | 5.6 | 0.98 | 0.95 | −56 | 1.3 |
| Ex. 9-5 | 20 | 40 | 10 | 30 | 521 | 2.8 | 0.98 | 0.99 | 36 | 2.2 |
| Ex. 9-6 | 50 | 30 | 10 | 10 | 386 | 6.2 | 0.98 | 0.96 | −1 | −1.8 |
| Ex. 9-7 | 40 | 30 | 10 | 20 | 453 | 4.0 | 0.98 | 1.00 | 111 | −0.5 |
| Ex. 9-8 | 30 | 30 | 10 | 30.0 | 521 | 2.0 | 0.98 | 1.03 | 166 | 0.8 |
| Ex. 9-9 | 20 | 30 | 10 | 40.0 | 588 | 0.8 | 0.98 | 1.05 | 173 | 2.6 |
| Ex. 9-10 | 20 | 50 | 20 | 10.0 | 702 | 9.2 | 1.00 | 0.82 | −464 | −0.3 |
| Ex. 9-11 | 10 | 50 | 20 | 20.0 | 770 | 6.4 | 0.98 | 0.88 | −270 | 1.4 |
| Ex. 9-12 | 30 | 40 | 20 | 10.0 | 702 | 7.2 | 0.99 | 0.88 | −268 | −1.9 |
| Ex. 9-13 | 20 | 40 | 20 | 20.0 | 770 | 4.6 | 0.98 | 0.93 | −118 | −0.5 |
| Ex. 9-14 | 10 | 40 | 20 | 30.0 | 838 | 2.0 | 0.99 | 0.97 | −33 | 0.6 |
| Ex. 9-15 | 40 | 30 | 20 | 10.0 | 702 | 5.4 | 0.98 | 0.94 | −68 | −3.4 |
| Ex. 9-16 | 30 | 30 | 20 | 20.0 | 770 | 3.2 | 0.98 | 0.98 | 39 | −2.0 |
| Ex. 9-17 | 20 | 30 | 20 | 30.0 | 838 | 1.6 | 0.98 | 1.01 | 88 | −0.5 |
| Ex. 9-18 | 10 | 30 | 20 | 40.0 | 905 | 0.6 | 0.99 | 1.02 | 89 | 1.6 |

Ex. 10-1 to 10-12

In Ex. 10-1 to 10-12, a working fluid comprising, in addition to HFO-1123 and CF$_3$I, HFC-125, HFC-134a and HFC-32 in a proportion as identified in Table 21 was prepared. By the above method, the temperature glide, the discharge temperature difference and the refrigerating cycle performance (relative refrigerating capacity and relative coefficient of performance) were measured and calculated, and the results are shown in Table 21.

TABLE 21

| | Working fluid composition [mass %] | | | | | Evaluation | | | | |
| | | | | | | | | (Relative to R410A) | | |
| | HFO-1123 | CF$_3$I | HFC-125 | HFC-134a | HFC-32 | GWP | Temperature glide [° C.] | Relative COP | Relative capacity | Discharge pressure difference [kPa] | Discharge temperature difference [° C.] |
|---|---|---|---|---|---|---|---|---|---|---|---|
| Ex. 10-1 | 40 | 30 | 10 | 10 | 10 | 515 | 6.8 | 1.01 | 0.92 | −198 | −3.0 |
| Ex. 10-2 | 30 | 30 | 10 | 10 | 20 | 583 | 5.0 | 1.00 | 0.95 | −103 | −1.1 |
| Ex. 10-3 | 20 | 30 | 10 | 10 | 30 | 651 | 3.4 | 1.00 | 0.97 | −66 | 0.9 |
| Ex. 10-4 | 10 | 30 | 10 | 10 | 40 | 718 | 2.6 | 1.00 | 0.98 | −73 | 3.4 |
| Ex. 10-5 | 40 | 20 | 10 | 20 | 10 | 645 | 5.4 | 1.01 | 0.90 | −236 | −3.9 |
| Ex. 10-6 | 30 | 20 | 10 | 20 | 20 | 713 | 5.0 | 1.01 | 0.92 | −191 | −1.5 |
| Ex. 10-7 | 20 | 20 | 10 | 20 | 30 | 781 | 4.6 | 1.01 | 0.93 | −190 | 1.0 |
| Ex. 10-8 | 10 | 20 | 10 | 20 | 40 | 848 | 4.0 | 1.01 | 0.93 | −220 | 3.6 |
| Ex. 10-9 | 40 | 10 | 10 | 30 | 10 | 775 | 6.4 | 1.01 | 0.88 | −299 | −3.8 |
| Ex. 10-10 | 30 | 10 | 10 | 30 | 20 | 843 | 6.2 | 1.01 | 0.89 | −290 | −1.2 |
| Ex. 10-11 | 20 | 10 | 10 | 30 | 30 | 910 | 5.8 | 1.02 | 0.90 | −313 | 1.3 |
| Ex. 10-12 | 10 | 10 | 10 | 30 | 40 | 978 | 5.0 | 1.02 | 0.89 | −356 | 3.7 |

Ex. 2-17, 3-21, 4-31 and 5-28

With respect to a working fluid comprising, in addition to HFO-1123 and CF$_3$I, HFC-125, HFC-134a, HFC-32 or HFO-1234yf in a proportion as identified in Table 22, by the above method, incombustibility was measured and evaluated, and the results are shown in Table 22.

TABLE 22

| | Working fluid composition [mass %] | | | | | | Combustibility evaluation |
| | HFO-1123 | CF$_3$I | HFC-125 | HFC-134a | HFC-32 | HFO-1234yf | |
|---|---|---|---|---|---|---|---|
| Ex. 2-17 | 40 | 30 | 30 | | | | Incombustible |
| Ex. 3-21 | 30 | 40 | | 30 | | | Incombustible |
| Ex. 4-31 | 10 | 50 | | | 40 | | Incombustible |
| Ex. 5-28 | 10 | 60 | | | | 30 | Incombustible |

INDUSTRIAL APPLICABILITY

The composition for a heat cycle system of the present invention and the heat cycle system employing the composition, are useful for a refrigerator (such as a built-in showcase, a separate showcase, an industrial fridge freezer, a vending machine or an ice making machine), an air-conditioning apparatus (such as a room air-conditioner, a store package air-conditioner, a building package air-conditioner, a plant package air-conditioner, a gas engine heat pump, a train air-conditioning system or an automobile air-conditioning system), power generation system (such as exhaust heat recovery power generation) or a heat transport apparatus (such as a heat pipe).

This application is a continuation of PCT Application No. PCT/JP2019/038790, filed on Oct. 1, 2019, which is based upon and claims the benefit of priority from Japanese Patent Application No. 2018-186916 filed on Oct. 1, 2018 and Japanese Patent Application No. 2018-193586 filed on Oct. 12, 2018. The contents of those applications are incorporated herein by reference in their entireties.

REFERENCE SYMBOLS

10: Refrigerating cycle system, 11: compressor, 12: condenser, 13: expansion valve, 14: evaporator, 15, 16: pump.

What is claimed is:

1. A composition for a heat cycle system, comprising:
a working fluid for heat cycle containing 1,1,2-trifluoroethylene, CF$_3$I and 2,3,3,3-tetrafluoropropene,
wherein the working fluid has and having a temperature glide of at most 7° C.,
a content of the 2,3,3,3-tetrafluoropropene is 50 mass % or more relative to a total content of the 1,1,2-trifluoroethylene, the CF$_3$I, and the 2,3,3,3-tetrafluoropropene,
a content of the 1,1,2-trifluoroethylene is 20 mass % or more relative to a total content of the working fluid, and
a total content of the 1,1,2-trifluoroethylene and the CF$_3$I is 50 mass % or less relative to the total content of the working fluid.

2. The composition for a heat cycle system according to claim 1, wherein the working fluid further contains a hydrofluorocarbon selected from the group consisting of difluoromethane, pentafluoroethane, 1,1,1,2-tetrafluoroethane and fluoroethane.

3. The composition for a heat cycle system according to claim 2, wherein the hydrofluorocarbon is difluoromethane.

4. The composition for a heat cycle system according to claim 2, wherein the hydrofluorocarbon is pentafluoroethane.

5. The composition for a heat cycle system according to claim 2, wherein the hydrofluorocarbon is 1,1,1,2-tetrafluoroethane.

6. The composition for a heat cycle system according to claim 2, wherein the hydrofluorocarbon is fluoroethane.

7. The composition for a heat cycle system according to claim 1, wherein the working fluid further contains a hydrofluoroolefin selected from the group consisting of trans-1,3,3,3-tetrafluoropropene, cis-1,3,3,3-tetrafluoropropene, trans-1,2-difluoroethylene and cis-1,2-difluoroethylene.

8. The composition for a heat cycle system according to claim 1, wherein the working fluid further contains propane.

9. The composition for a heat cycle system according to claim 2, wherein the content of the hydrofluorocarbon is from 10 to 30 mass % relative to the total content of the working fluid.

10. The composition for a heat cycle system according to claim 1, which is incombustible.

11. A heat cycle system, comprising the composition for a heat cycle system according to claim 1.

12. The heat cycle system according to claim 11, which is a refrigerating apparatus, an air-conditioning apparatus, a power generation system, a heat transport apparatus or a secondary cooling machine.

* * * * *